US012212523B2

(12) United States Patent
Muruganathan et al.

(10) Patent No.: US 12,212,523 B2
(45) Date of Patent: Jan. 28, 2025

(54) SYSTEMS AND METHODS OF CSI REFERENCE RESOURCE DETERMINATION

(71) Applicant: Telefonaktiebolaget LM Ericsson (publ), Stockholm (SE)

(72) Inventors: Siva Muruganathan, Stittsville (CA); Shiwei Gao, Nepean (CA); Xingqin Lin, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 349 days.

(21) Appl. No.: 17/636,937

(22) PCT Filed: Aug. 24, 2020

(86) PCT No.: PCT/IB2020/057909
§ 371 (c)(1),
(2) Date: Feb. 21, 2022

(87) PCT Pub. No.: WO2021/038429
PCT Pub. Date: Mar. 4, 2021

(65) Prior Publication Data
US 2022/0376871 A1 Nov. 24, 2022

Related U.S. Application Data

(60) Provisional application No. 62/891,106, filed on Aug. 23, 2019.

(51) Int. Cl.
*H04L 5/00* (2006.01)
*H04W 24/10* (2009.01)
*H04W 56/00* (2009.01)

(52) U.S. Cl.
CPC .......... *H04L 5/0053* (2013.01); *H04L 5/0048* (2013.01); *H04W 24/10* (2013.01); *H04W 56/0045* (2013.01)

(58) Field of Classification Search
CPC ... H04L 5/0053; H04L 5/0048; H04L 5/0057; H04L 5/005; H04L 5/0094; H04W 24/10;
(Continued)

(56) References Cited

U.S. PATENT DOCUMENTS

2016/0323901 A1 11/2016 Yum et al.
2019/0207737 A1* 7/2019 Babaei ................. H04B 7/0617

FOREIGN PATENT DOCUMENTS

| CN | 107317646 A | 11/2017 |
| CN | 109462425 A | 3/2019 |
| WO | 2020031155 A1 | 2/2020 |

OTHER PUBLICATIONS

First Office Action for Chinese Patent Application No. 2020800593299, mailed Nov. 18, 2023, 8 pages.
(Continued)

*Primary Examiner* — Dady Chery
(74) *Attorney, Agent, or Firm* — Withrow & Terranova, PLLC

(57) ABSTRACT

Systems and methods of reference resource determination are provided. A method performed by a wireless device for determining a reference resource includes: receiving an indication of at least one configurable offset value; receiving one or more configurations of resources for channel measurement and one or more configurations of measurement reporting; and determining a reference resource for a measurement report to be reported in slot n' using the at least one configurable offset received from the network node. In some embodiments, this includes configurations of Channel State Information Reference Signals (CSI-RS) resources for channel measurement and/or CSI reporting. In this way, CSI reporting with proper CSI reference resource determination is enabled. In some embodiments, this is suitable for Non-
(Continued)

Terrestrial Network (NTN) scenarios where the RTT can be in the order of 10s to 100s of milliseconds.

28 Claims, 21 Drawing Sheets

(58) Field of Classification Search
CPC ........... H04W 56/0045; H04W 72/046; H04W 72/1268; H04W 72/23; H04W 76/27; H04B 7/18504; H04B 7/2125; H04B 7/0626; H04B 7/0632; H04B 7/0695; H04B 7/088
See application file for complete search history.

(56) References Cited

OTHER PUBLICATIONS

Ericsson, "R1-1907760: Feature lead summary#2 on physical layer control procedures for NTN," 3GPP TSG-RAN WG1 Meeting #97, May 13-17, 2019, Reno, Nevada, 8 pages.
Notice of Reasons for Rejection for Japanese Patent Application No. 2022-511035, mailed May 9, 2023, 8 pages.
Ericsson, "R1-1909485: FL summary#0 for physical layer control procedures for NTN," 3GPP TSG-RAN WG1 Meeting #98, Aug. 26-30, 2019, Prague, Czech Republic, 8 pages.
Notification to Grant for Chinese Patent Application No. 202080059329.9, mailed May 13, 2024, 6 pages.
Intention to Grant for European Patent Application No. 20764477.4, mailed Apr. 17, 2024, 8 pages.
Decision to Grant for Japanese Patent Application No. 2022-511035, mailed May 28, 2024, 6 pages.
Author Unknown, "Technical Specification Group Radio Access Network; NR; Physical layer procedures for data (Release 15)," Technical Specification 38.214, Version 15.6.0, Jun. 2019, 3GPP Organizational Partners, 105 pages.
Author Unknown, "Technical Specification Group Radio Access Network; Study on New Radio (NR) to support non-terrestrial networks (Release 15)," Technical Report 38.811, Version 15.1.0, Jun. 2019, 3GPP Organizational Partners, 126 pages.
Ericsson, "R1-1909111: On physical layer control procedures for NTN," 3GPP TSG-RAN WG1 Meeting #98, Aug. 26-30, 2019, Prague, Czech Republic, 10 pages.
Ericsson, "R1-1909507: On physical layer control procedures for NTN," 3GPP TSG-RAN WG1 Meeting #98, Aug. 26-30, 2019, Prague, Czech Republic, 13 pages.
Mediatek Inc., "R1-1906467: Physical layer control procedure in NR-NTN," 3GPP TSG RAN WG1 Meeting #97, May 13-17, 2019, Reno, Nevada, 5 pages.
International Search Report and Written Opinion for International Patent Application No. PCT/IB2020/057909, mailed Nov. 16, 2020, 16 pages.
International Preliminary Report on Patentability for International Patent Application No. PCT/IB2020/057909, mailed Dec. 2, 2021, 22 pages.

* cited by examiner

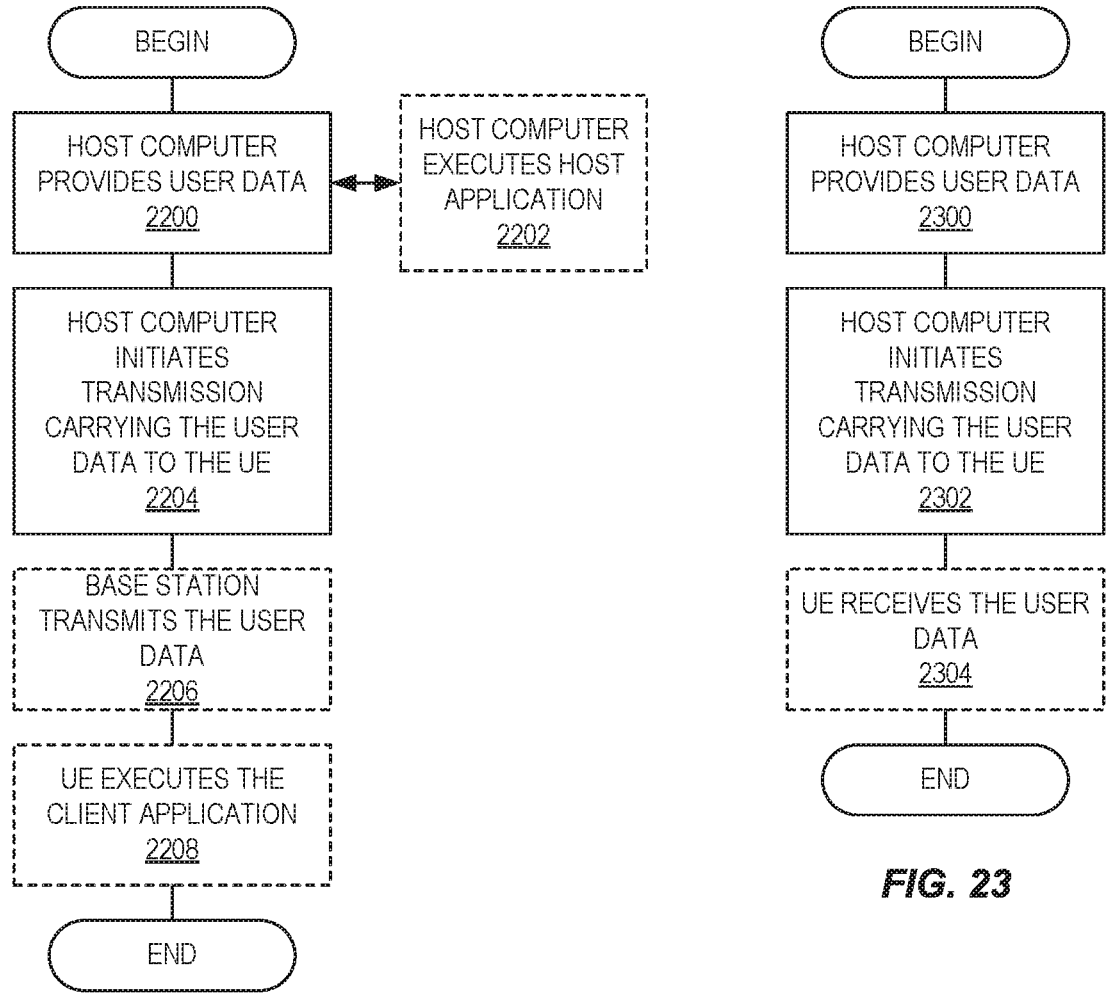

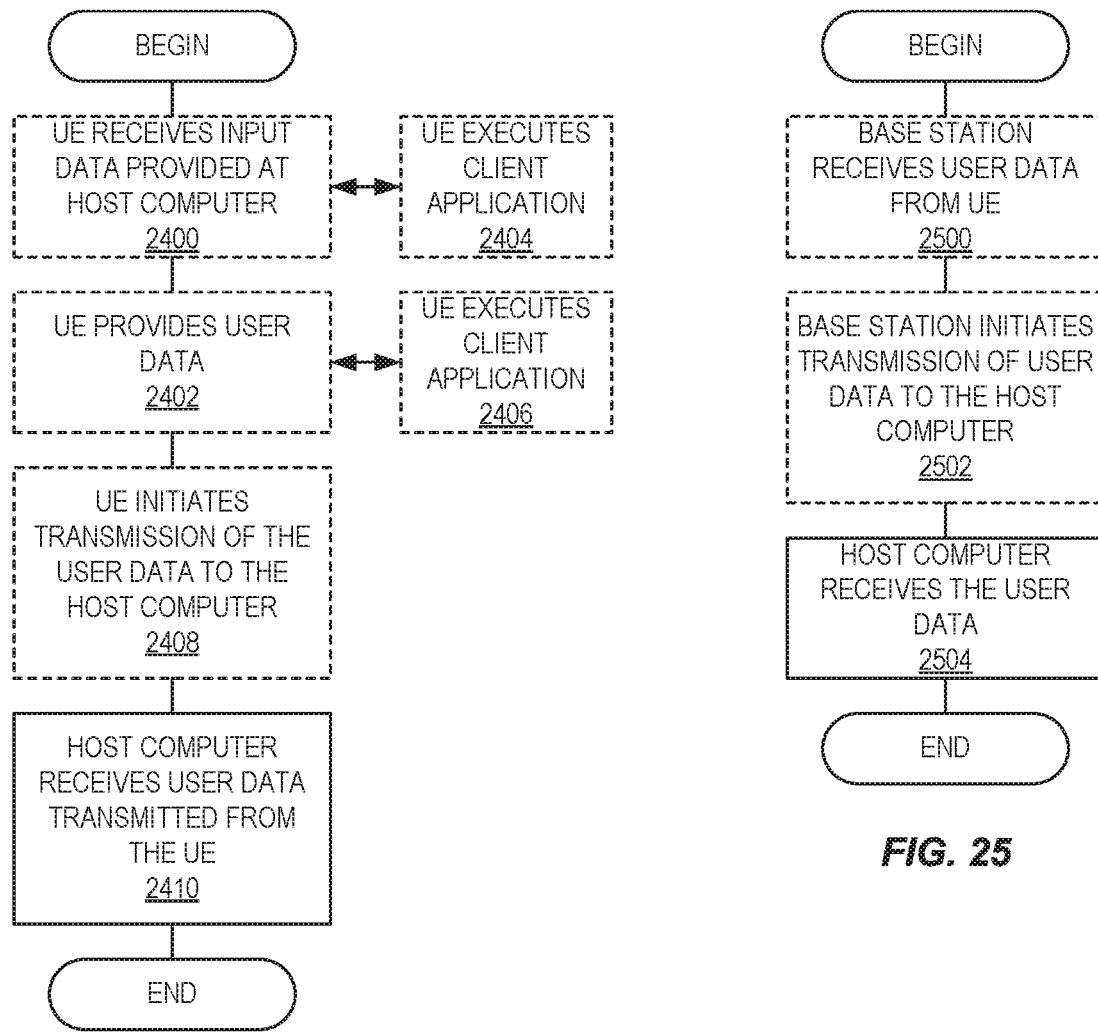

SYSTEMS AND METHODS OF CSI REFERENCE RESOURCE DETERMINATION

RELATED APPLICATIONS

This application is a 35 U.S.C. § 371 national phase filing of International Application No. PCT/IB2020/057909, filed Aug. 24, 2020, which claims the benefit of provisional patent application Ser. No. 62/891,106, filed Aug. 23, 2019, the disclosures of which are hereby incorporated herein by reference in their entireties.

TECHNICAL FILED

The current disclosure relates to determining a reference resource.

BACKGROUND

The next generation mobile wireless communication system (5G) or new radio (NR), will support a diverse set of use cases and a diverse set of deployment scenarios. The later includes deployment at both low frequencies (below 6 GHz) and very high frequencies (up to 10's of GHz).

Like in LTE, NR uses CP-OFDM (Cyclic Prefix Orthogonal Frequency Division Multiplexing) in the downlink (i.e., from a network node, gNB, eNB, or base station, to a user equipment or UE) and both CP-OFDM and DFT-spread OFDM (DFT-S-OFDM) in the uplink (i.e., from UE to gNB). In the time domain, NR downlink and uplink are organized into equally-sized subframes of 1 ms each. A subframe is further divided into multiple slots of equal duration.

The slot length depends on subcarrier spacing. For subcarrier spacing of $\Delta f=15$ kHz, there is only one slot per subframe and each slot consists of 14 OFDM symbols.

Data scheduling in NR can be in slot basis as in LTE, an example is shown in FIG. 1 with a 14-symbol slot, where the first two symbols contain Physical Downlink Control Channel (PDCCH) and the rest contains Physical Data Channel (PDCH), either Physical Downlink Data Channel (PDSCH) or Physical Uplink Data Channel (PUSCH).

Different subcarrier spacing values are supported in NR. The supported subcarrier spacing values (also referred to as different numerologies) are given by $\Delta f=(15 \times 2^\alpha)$ kHz where $\alpha$ is a non-negative integer. $\Delta f=15$ kHz is the basic subcarrier spacing that is also used in LTE. The slot durations at different subcarrier spacings are shown in Table 1. In the table, the numerology is denoted as ($\mu$). Numerology with subscript 0 corresponds to 15 kHz, numerology with subscript 1 corresponds to 30 kHz, etc. It should be noted that the numerology for uplink and downlink can be different in NR.

TABLE 1

Slot length at different numerologies.

| Numerology ($\mu$) | Slot length | RB BW |
|---|---|---|
| $\mu_0$ = 15 kHz | 1 ms | 180 kHz |
| $\mu_1$ = 30 kHz | 0.5 ms | 360 kHz |
| $\mu_2$ = 60 kHz | 0.25 ms | 720 kHz |
| $\mu_3$ = 120 kHz | 125 µs | 1.44 MHz |
| $\mu_4$ = 240 kHz | 62.5 µs | 2.88 MHz |

In the frequency domain, a system bandwidth is divided into resource blocks (RBs), each corresponds to 12 contiguous subcarriers. The RBs are numbered starting with 0 from one end of the system bandwidth. The basic NR physical time-frequency resource grid is illustrated in FIG. 2, where only one Resource Block (RB) within a 14-symbol slot is shown. One OFDM subcarrier during one OFDM symbol interval forms one resource element (RE).

Downlink transmissions are dynamically scheduled, i.e., in each slot the gNB transmits downlink control information (DCI) over PDCCH about which UE data is to be transmitted to and which RBs in the current downlink slot the data is transmitted on. PDCCH is typically transmitted in the first one or two OFDM symbols in each slot in NR. The UE data are carried on PDSCH. A UE first detects and decodes PDCCH and the decoding is successfully, it then decodes the corresponding PDSCH based on the decoded control Information in the PDCCH.

Uplink data transmissions are also dynamically scheduled using PDCCH. Similar to downlink, a UE first decodes uplink grants in PDCCH and then transmits data over PUSCH based the decoded control information in the uplink grant such as modulation order, coding rate, uplink resource allocation, etc.

CSI Feedback

For CSI feedback, NR has adopted an implicit CSI mechanism where a UE feedback the downlink channel state information Including typically a transmission rank indicator (RI), a precoder matrix indicator (PMI), and channel quality indicator (CQI) for each codeword. The CQI/RI/PMI report can be either wideband or subband based on configuration.

The RI corresponds to a recommended number of layers that are to be spatially multiplexed and thus transmitted in parallel over the effective channel; the PMI identifies a recommended precoding matrix to use; the CQI represents a recommended modulation level (i.e., QPSK, 16 QAM, etc.) and coding rate for each codeword or TB. NR supports transmission of one or two codewords to a UE in a slot where two codewords are used for 5 to 8 layer transmission and one codeword is used for 1 to 4 layer transmission. There is thus a relation between a CQI and an SINR of the spatial layers over which the codewords are transmitted and for two codewords there are two CQI values fed back.

In NR, in addition to periodic and aperiodic CSI reporting as in LTE, semi-persistent CSI reporting is also supported. Thus, three types of CSI reporting will be supported in NR as follows:

Periodic CSI (P-CSI) Reporting on PUCCH: CSI is reported periodically by a UE. Parameters such as periodicity and slot offset are configured semi-statically by higher layer RRC signaling from the gNB to the UE Aperiodic CSI (A-CSI) Reporting on PUSCH: This type of CSI reporting involves a single-shot (i.e., one time) CSI report by a UE which is dynamically triggered by the gNB using DCI. Some of the parameters related to the configuration of the aperiodic CSI report is semi-statically configured by RRC but the triggering is dynamic Semi-Persistent CSI (SP-CSI) Reporting on PUSCH: similar to periodic CSI reporting, semi-persistent CSI reporting has a periodicity and slot offset which may be semi-statically configured. However, a dynamic trigger from gNB to UE may be needed to allow the UE to begin semi-persistent CSI reporting. A dynamic trigger from gNB to UE is needed to request the UE to stop the semi-persistent CSI reporting.

Channel State Information Reference Signals (CSI-RS)

For CSI measurement and feedback, dedicated reference signals: CSI-RS are defined. A CSI-RS resource consist of between 1 and 32 CSI-RS ports and each port is typically transmitted on each transmit antenna (or virtual transmit antenna in case the port is precoded and mapped to multiple transmit antennas) and is used by a UE to measure downlink channel between each of the transmit antenna ports and each of its receive antenna ports. The antenna ports are also referred to as CSI-RS ports. The supported number of antenna ports in NR are {1, 2, 4, 8, 12, 16, 24, 32}. By measuring the received CSI-RS, a UE can estimate the channel that the CSI-RS is traversing, including the radio propagation channel, potential precoding or beamforming, and antenna gains. The CSI-RS for the above purpose is also referred to as Non-Zero Power (NZP) CSI-RS but there are also zero power (ZP) CSI-RS used for other purposes than coherent channel measurements.

CSI-RS can be configured to be transmitted in certain REs in a slot and certain slots. FIG. 3 shows an example of a CSI-RS resource mapped to REs for 12 antenna ports, where one RE per RB per port is shown.

In addition, interference measurement resource for CSI feedback (CSI-IM) is also defined in NR for a UE to measure interference. A CSI-IM resource contains four REs, either four adjacent RE in frequency in the same OFDM symbol or two by two adjacent REs in both time and frequency in a slot. By measuring both the channel based on NZP CSI-RS and the interference based on CSI-IM, a UE can estimate the effective channel and noise plus interference to determine the CSI, i.e., rank, precoding matrix, and the channel quality.

Furthermore, a UE in NR may be configured to measure interference based on one or multiple NZP CSI-RS resource.

In NR, the following three types of CSI-RS transmissions are supported:

Periodic CSI-RS (P CSI-RS): CSI-RS is transmitted periodically in certain slots. This CSI-RS transmission is semi-statically configured using parameters such as CSI-RS resource, periodicity and slot offset.

Aperiodic CSI-RS (AP CSI-RS): This is a one-shot CSI-RS transmission that can happen in any slot. Here, one-shot means that CSI-RS transmission only happens once per trigger. The CSI-RS resources (i.e., the resource element locations which consist of subcarrier locations and OFDM symbol locations) for aperiodic CSI-RS are semi-statically configured. The transmission of aperiodic CSI-RS is triggered by dynamic signaling through PDCCH using the CSI request field in UL DCI. Multiple aperiodic CSI-RS resources can be included in a CSI-RS resource set and the triggering of aperiodic CSI-RS is on a resource set basis.

Semi-Persistent CSI-RS (SP CSI-RS): Similar to periodic CSI-RS, resources for semi-persistent CSI-RS transmissions are semi-statically configured with parameters such as periodicity and slot offset. However, unlike periodic CSI-RS, dynamic signaling is needed to activate and deactivate the CSI-RS transmission.

In the case of aperiodic CSI-RS and/or aperiodic CSI reporting, the gNB RRC configures the UE with $S_c$ CSI triggering states. Each triggering state contains the aperiodic CSI report setting to be triggered along with the associated aperiodic CSI-RS resource sets.

CSI Reference Resource Definition in NR Rel-15

In 3GPP TS 38.214, the reference resource in the time domain for different CSI reporting types are defined.

The CSI reference resource for a CSI report in uplink slot n' is defined by a single downlink slot $n-n_{CSI\_ref}$ where $$n = \left\lfloor n' \cdot \frac{2^{\mu_{DL}}}{2^{\mu_{UL}}} \right\rfloor.$$

Here, $\mu_{DL}$ and $\mu_{UL}$ are the subcarrier spacing configurations for DL and UL, respectively. The value of $n_{CSI\_ref}$ depends on the type of CSI report.

For periodic and semi-persistent CSI reporting, $n_{CSI\_ref}$ defined as follows:

if a single CSI-RS resource is configured for channel measurement, $n_{CSI\_ref}$ is the smallest value greater than or equal to $4 \cdot 2^{\mu_{DL}}$, such that it corresponds to a valid downlink slot, or if multiple CSI-RS resources are configured for channel measurement, $n_{CSI\_ref}$ is the smallest value greater than or equal to $5 \cdot 2^{\mu_{DL}}$, such that it corresponds to a valid downlink slot.

For aperiodic CSI reporting, $n_{CSI\_ref}$ defined as follows:

if the UE is indicated by the DCI to report CSI in the same slot as the CSI request, $n_{CSI\_ref}$ is such that the reference resource is in the same valid downlink slot as the corresponding CSI request, otherwise $n_{CSI\_ref}$ the smallest value greater than or equal to $\lfloor Z'/N_{symb}^{slot} \rfloor$, such that slot $n-n_{CSI\_ref}$ corresponds to a valid downlink slot. Here, $N_{symb}^{slot}$ denotes the number of symbols per slot. The parameter Z' corresponds to delay requirements defined in 3GPP TS 38.214.

a. If the time between the last symbol of aperiodic CSI-RS/IM and the first symbol of PUSCH (which carries the aperiodic CSI report) is less than Z', then the UE may ignore the DCI requesting the aperiodic CSI report and is not required to update the CSI report.

b. When periodic or semi-persistent CSI-RS/CSI-IM is used for channel/interference measurements, the UE is not expected to measure channel/interference on CSI-RS/CSI-IM whose last OFDM symbol is received up to Z' symbols before the transmission time of the first OFDM symbol of the aperiodic CSI report.

c. The values of Z' depend on the CSI computation delay requirements. Note that there are two CSI computation delay requirements specified in 3GPP TS 38.214 in Tables 5.4-1 and 5.4-2.

The 'valid downlink slot' is defined as follows in 3GPP TS 38.214:

"A slot in a serving cell shall be considered to be a valid downlink slot if:

it comprises at least one higher layer configured downlink or flexible symbol, and it does not fall within a configured measurement gap for that UE"

Non-Terrestrial Networks

In Release 15, 3GPP started the work to prepare NR for operation in a Non-Terrestrial Network (NTN). The work was performed within the study item "NR to support Non-Terrestrial Networks" and resulted in 3GPP TR 38.811. In Release 16, the work to prepare NR for operation in an NTN network continues with the study item "Solutions for NR to support Non-Terrestrial Network".

A satellite radio access network usually includes the following components:

A satellite that refers to a space-borne platform.

An earth-based gateway that connects the satellite to a base station or a core network, depending on the choice of architecture.

Feeder link that refers to the link between a gateway and a satellite

Service link that refers to the link between a satellite and a UE.

Two popular architectures are the Bent pipe transponder and the Regenerative transponder architectures. In the first case, the base station is located on earth behind the gateway, and the satellite operates as a repeater forwarding the feeder link signal to the service link, and vice versa. In the second case, the satellite is in the base station and the service link connects it to the earth-based core network.

Depending on the orbit altitude, a satellite may be categorized as low earth orbit (LEO), medium earth orbit (MEO), or geostationary earth orbit (GEO) satellite.

LEO: typical heights ranging from 250-1,500 km, with orbital periods ranging from 90-120 minutes.

MEO: typical heights ranging from 5,000-25,000 km, with orbital periods ranging from 3-15 hours.

GEO: height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The spotbeam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

Timing Advance in NTN

5G NR utilizes orthogonal frequency-division multiple access (OFDMA) as the multi-access scheme in the uplink. The transmissions from different UEs in a cell are time-aligned at the 5G NodeB (gNB) to maintain uplink orthogonality. Time alignment is achieved by using different Timing Advance (TA) values at different UEs to compensate for their different propagation delays. The required TA for a UE is roughly equal to the round-trip delay between the UE and gNB.

For the initial TA, after a UE has synchronized in the downlink and acquired certain system information, the UE transmits a random-access preamble (known as Message 1 (Msg1)) on physical random-access channel (PRACH). The gNB estimates the uplink timing from the received random-access preamble and responds Message 2 (Msg2) with a TA command. This allows the establishment of initial TA for the UE.

The propagation delays in terrestrial mobile systems are usually less than 1 ms. In contrast, the propagation delays in NTN are much longer, ranging from several milliseconds to hundreds of milliseconds depending on the altitudes of the spaceborne or airborne platforms in NTN. Dealing with such long propagation delays requires modifications of many timing aspects in NR from physical layer to higher layers, including the TA mechanism.

There are two types of timing advance mechanisms, which are referred to as large TA and small TA.

With large TA, each UE has a TA equal to its round-trip time and thus fully compensates its RTT. This is illustrated in FIG. 4 which is an illustration of large TA compensating full RTT. Accordingly, gNB DL-UL frame timings are aligned.

With small TA, each UE has a TA equal to its round-trip time minus a reference round-trip time, i.e., differential RTT. For example, the reference RTT can be the minimum RTT of a cell, and thus the differential RTT of any UE in the cell is always non-negative. The maximum differential RTT depends on the cell size and may range from sub-millisecond to a few milliseconds. With small TA, gNB needs to manage a DL-UL frame timing shift on the order of the reference RTT, as illustrated in FIG. 5.

Improved systems and methods for determining a reference resource are needed.

SUMMARY

Systems and methods of reference resource determination are provided. In some embodiments, a method performed by a wireless device for determining a reference resource includes: receiving, from a network node, an indication of at least one configurable offset value to compensate for a Round Trip Time (RTT) value; receiving, from the network node, one or more configurations of resources for channel measurement and one or more configurations of measurement reporting; and determining, a reference resource for a measurement report to be reported in slot n' using the at least one configurable offset received from the network node. In some embodiments, this includes configurations of Channel State Information Reference Signals (CSI-RS) resources for channel measurement and/or CSI reporting. In this way, CSI reporting with proper CSI reference resource determination is enabled. In some embodiments, this is suitable for Non-Terrestrial Network (NTN) scenarios where the RTT can be in the order of 10s to 100s of milliseconds.

Certain aspects of the present disclosure and their embodiments may provide solutions to the aforementioned or other challenges. Some embodiments of this disclosure propose a solution for determining CSI reference resource for a CSI report. In some embodiments, a method performed by a wireless device for determining a reference resource includes receiving, from a network node, an indication of at least one configurable offset value to compensate for a Round Trip Time, RTT, value; receiving, from the network node, one or more configurations of resources for channel and/or interference measurement, and further receiving, from the network node, one or more configurations of measurement reporting; and determining, a reference resource for a measurement report to be reported in slot n' using the at least one configurable offset received from the network node.

In some embodiments, the at least one configurable offset value to compensate for the RTT value comprises at least one configurable offset value to compensate for a differential and/or common RTT.

In some embodiments, the one or more configurations of resources for channel and/or interference measurement comprise one or more configurations of CSI-RS resources for channel and interference measurement.

In some embodiments, the one or more configurations of measurement reporting comprises one or more configurations of CSI reporting.

In some embodiments, the at least one configurable offset can depend on the numerology used.

In some embodiments, the at least one configurable offset can be specifically configured to the wireless device by the network node.

In some embodiments, the wireless device is configured via RRC signaling.

In some embodiments, the at least one configurable offset can be broadcast by the network node in system information.

In some embodiments, the at least one configurable offset can be sent in a SIB.

In some embodiments, the method also includes determining the time location of the CSI reference resource in downlink slot n−$n_{CSI\_ref}$ where $n_{CSI\_ref}$ is the smallest value greater than or equal to X·$2^{\mu_{DL}}$+$K_{offset}$, wherein at least one of: $K_{offset}$ is one or a combination (e.g., sum) of the at least one configurable offset; and n is given by $$n = \left\lfloor n' \cdot \frac{2^{\mu_{DL}}}{2^{\mu_{UL}}} \right\rfloor,$$

and $\mu_{DL}/\mu_{UL}$ are the downlink/uplink numerology.

In some embodiments, X=4 if single CSI-RS resource is configured for channel measurement. In some embodiments, X=5 if multiple CSI-RS resources are configured for channel measurement.

In some embodiments, the method also includes determining the time location of the CSI reference resource in downlink slot n−$n_{CSI\_ref}$ where $n_{CSI\_ref}$ is the smallest value greater than or equal to $$\lfloor Z' / N_{symb}^{slot} \rfloor + K_{offset},$$

such that slot n−$n_{CSI\_ref}$ corresponds to a valid downlink slot wherein at least one of: $K_{offset}$ is one or a combination (e.g., sum) of the at least one configurable offset; n is given by $$n = \left\lfloor n' \cdot \frac{2^{\mu_{DL}}}{2^{\mu_{UL}}} \right\rfloor,$$

and $\mu_{DL}/\mu_{UL}$ are the downlink/uplink numerology; and Z' is a parameter that determines delay requirements and $N_{symb}^{slot}$ is the number of symbols per slot.

In some embodiments, the method also includes reporting the measurement report in uplink slot n'.

In some embodiments, the network node is a gNB.

In some embodiments, a method performed by a base station for determining a reference resource includes one or more of: transmitting, to a wireless device, an indication of at least one configurable offset value to compensate for a Round Trip Time, RTT, value; transmitting, to the wireless device, one or more configurations of resources for channel and/or interference measurement, and further transmitting, to the wireless device, one or more configurations of measurement reporting; and receiving, from the wireless device, a measurement report using a reference resource in slot n' where the reference resource is determined using the at least one configurable offset received from the network node.

There are, proposed herein, various embodiments which address one or more of the issues disclosed herein.

Certain embodiments may provide one or more of the following technical advantage(s). The proposed solution enables CSI reporting with proper CSI reference resource determination in NTN scenarios. The proposed method is suitable for NTN scenarios where the RTT can be in the order of 10s to 100s of milliseconds. The benefits of the solutions are further exemplified in the drawings.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 22 through 25 are flowcharts illustrating methods implemented in a communication system, according to some embodiments of the present disclosure.

DETAILED DESCRIPTION

Figure 1:
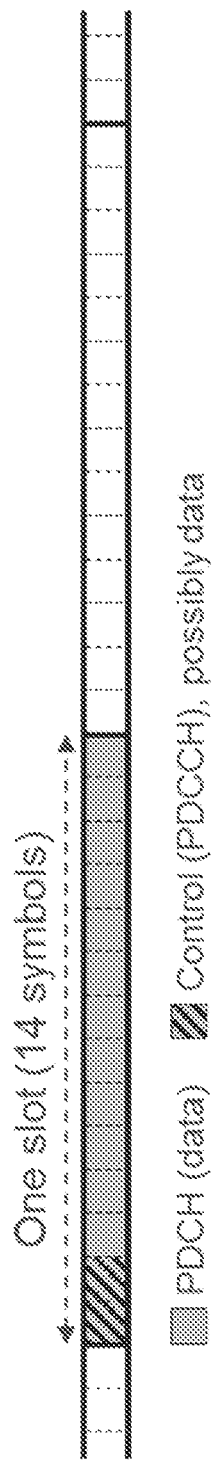
FIG. 1 illustrates a 14-symbol slot, where the first two symbols contain Physical Downlink Control Channel (PDCCH) and the rest contains Physical Data Channel (PDCH), either Physical Downlink Data Channel (PDSCH) or Physical Uplink Data Channel (PUSCH)
Figure 2:
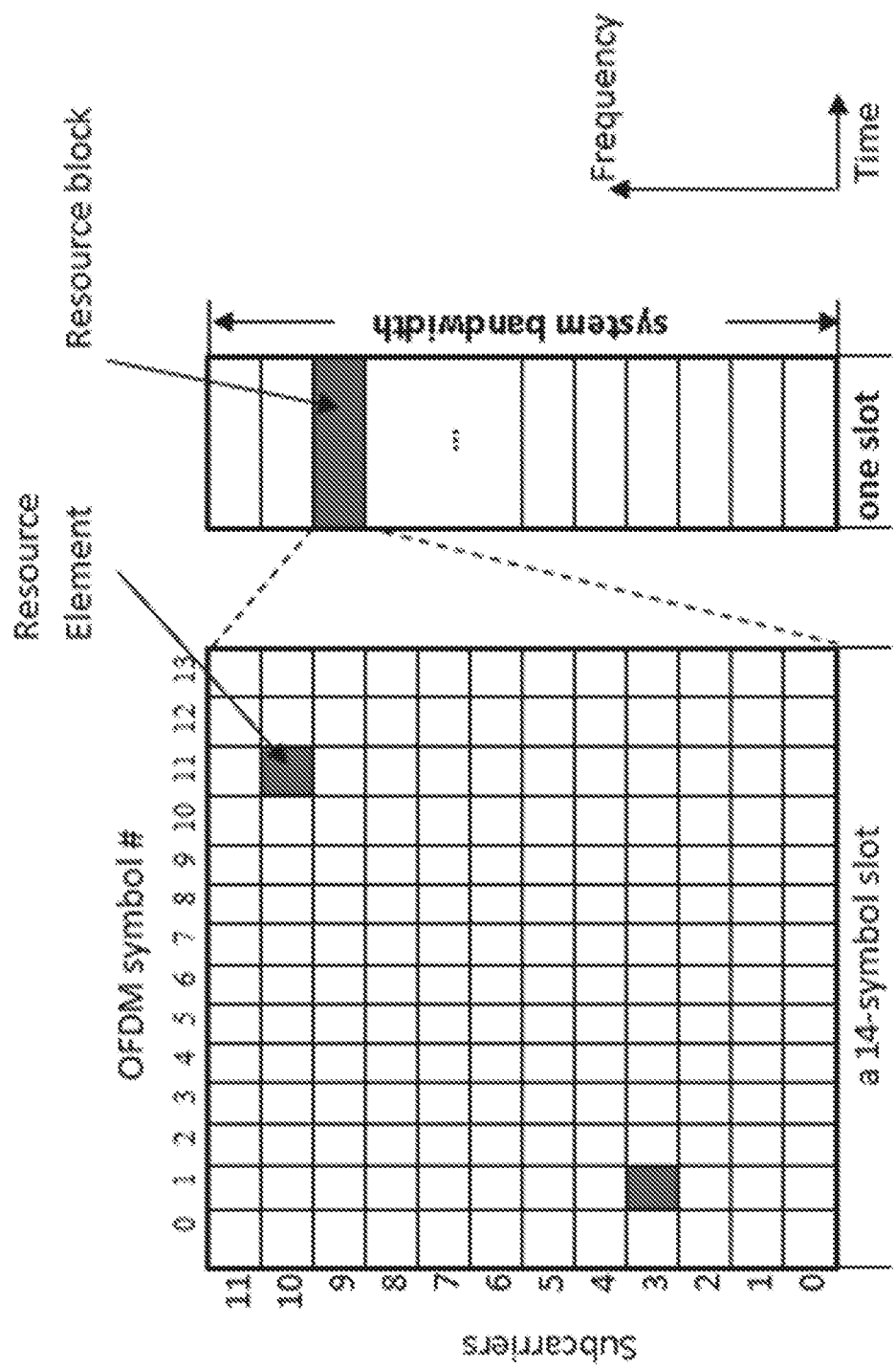
FIG. 2 illustrates a basic NR physical time-frequency resource grid where only one Resource Block (RB) within a 14-symbol slot is shown.
Figure 3:
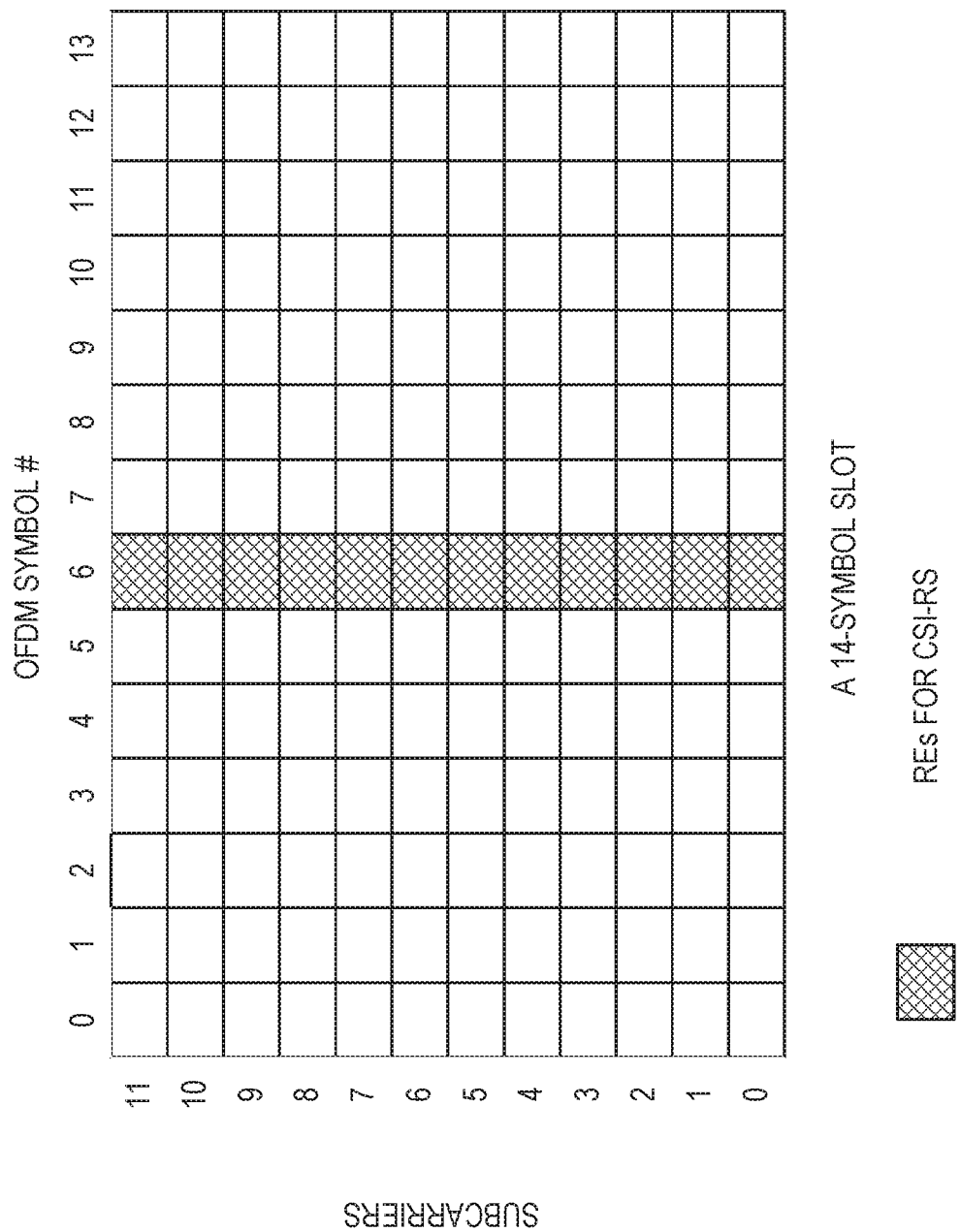
FIG. 3 shows an example of a CSI-RS resource mapped to REs for 12 antenna ports, where one RE per RB per port is shown.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 6:
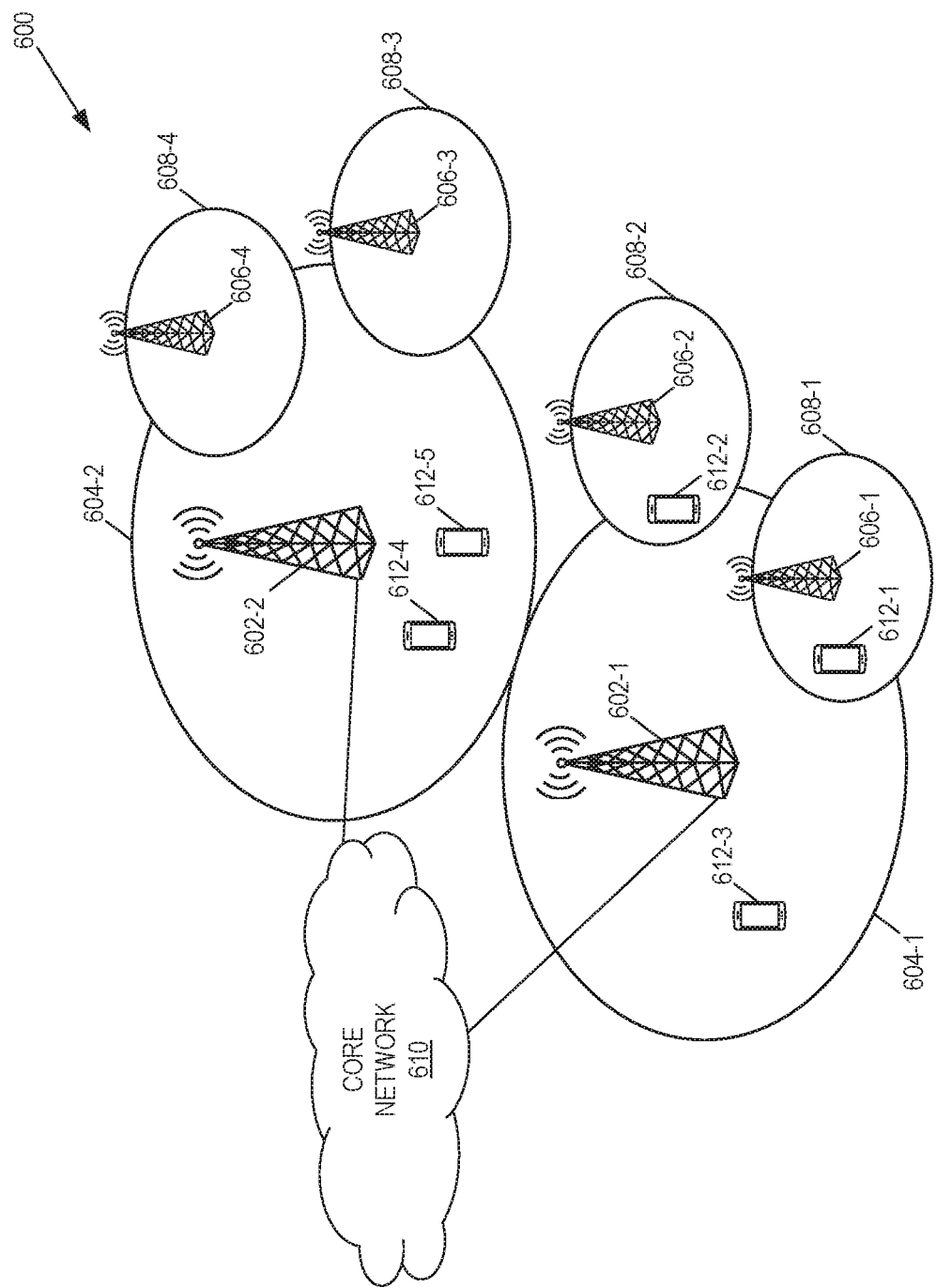
FIG. 6 illustrates one example of a cellular communications system 600 in which embodiments of the present disclosure may be implemented.

FIG. 6 illustrates one example of a cellular communications system 600 in which embodiments of the present disclosure may be implemented. In the embodiments described herein, the cellular communications system 600 is a 5G system (5GS) including a NR RAN or an Evolved Packet System (EPS) including a LTE RAN. In this example, the RAN includes base stations 602-1 and 602-2, which in LTE are referred to as eNBs and in 5G NR are referred to as gNBs, controlling corresponding (macro) cells 604-1 and 604-2. The base stations 602-1 and 602-2 are generally referred to herein collectively as base stations 602 and individually as base station 602. Likewise, the (macro) cells 604-1 and 604-2 are generally referred to herein collectively as (macro) cells 604 and individually as (macro) cell 604. The RAN may also include a number of low power nodes 606-1 through 606-4 controlling corresponding small cells 608-1 through 608-4. The low power nodes 606-1 through 606-4 can be small base stations (such as pico or femto base stations) or Remote Radio Heads (RRHs), or the like. Notably, while not illustrated, one or more of the small cells 608-1 through 608-4 may alternatively be provided by the base stations 602. The low power nodes 606-1 through 606-4 are generally referred to herein collectively as low power nodes 606 and individually as low power node 606. Likewise, the small cells 608-1 through 608-4 are generally referred to herein collectively as small cells 608 and individually as small cell 608. The cellular communications system 600 also includes a core network 610, which in the 5GS is referred to as the 5G core (5GC). The base stations 602 (and optionally the low power nodes 606) are connected to the core network 610.

The base stations 602 and the low power nodes 606 provide service to wireless devices 612-1 through 612-5 in the corresponding cells 604 and 608. The wireless devices 612-1 through 612-5 are generally referred to herein collectively as wireless devices 612 and individually as wireless device 612. The wireless devices 612 are also sometimes referred to herein as UEs.

Figure 7:
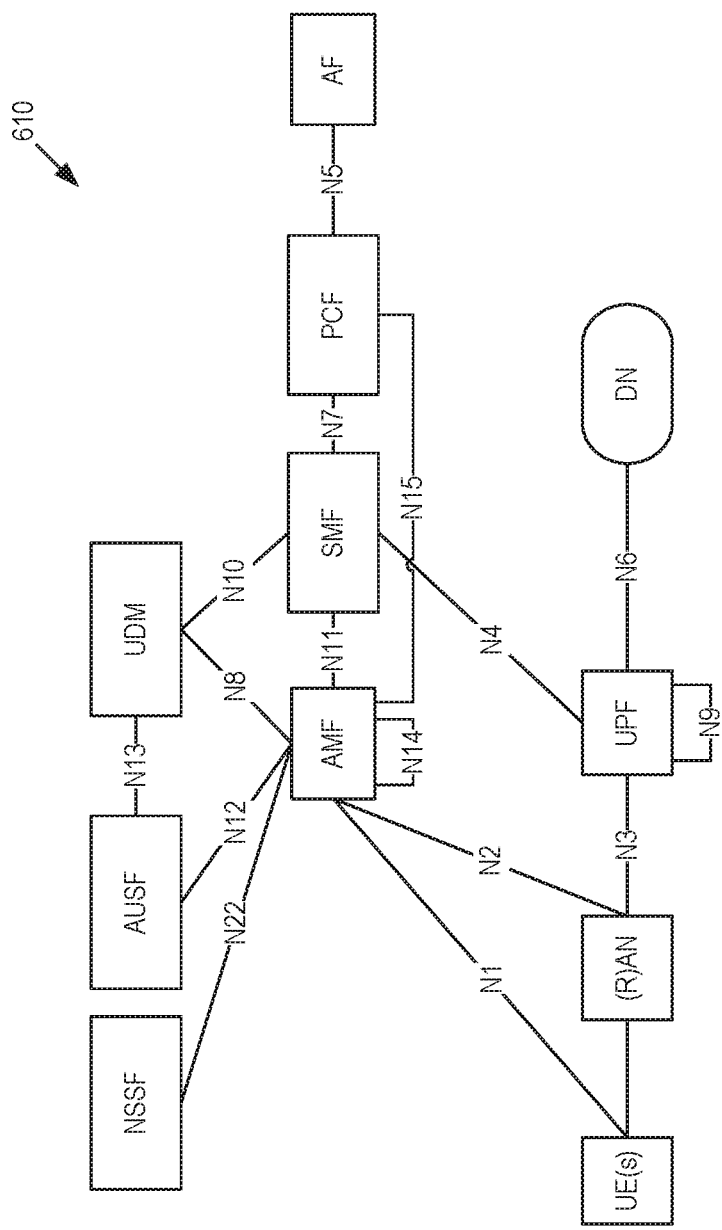
FIG. 7 illustrates a wireless communication system represented as a 5G network architecture composed of core Network Functions (NFs), where interaction between any two NFs is represented by a point-to-point reference point/interface.

FIG. 7 illustrates a wireless communication system represented as a 5G network architecture composed of core Network Functions (NFs), where interaction between any two NFs is represented by a point-to-point reference point/interface. FIG. 7 can be viewed as one particular implementation of the system 600 of FIG. 6.

Seen from the access side the 5G network architecture shown in FIG. 7 comprises a plurality of User Equipment (UEs) connected to either a Radio Access Network (RAN) or an Access Network (AN) as well as an Access and Mobility Management Function (AMF). Typically, the (R)AN comprises base stations, e.g., such as evolved Node Bs (eNBs) or NR base stations (gNBs) or similar. Seen from the core network side, the 5G core NFs shown in FIG. 7 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 7, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 7. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 8:
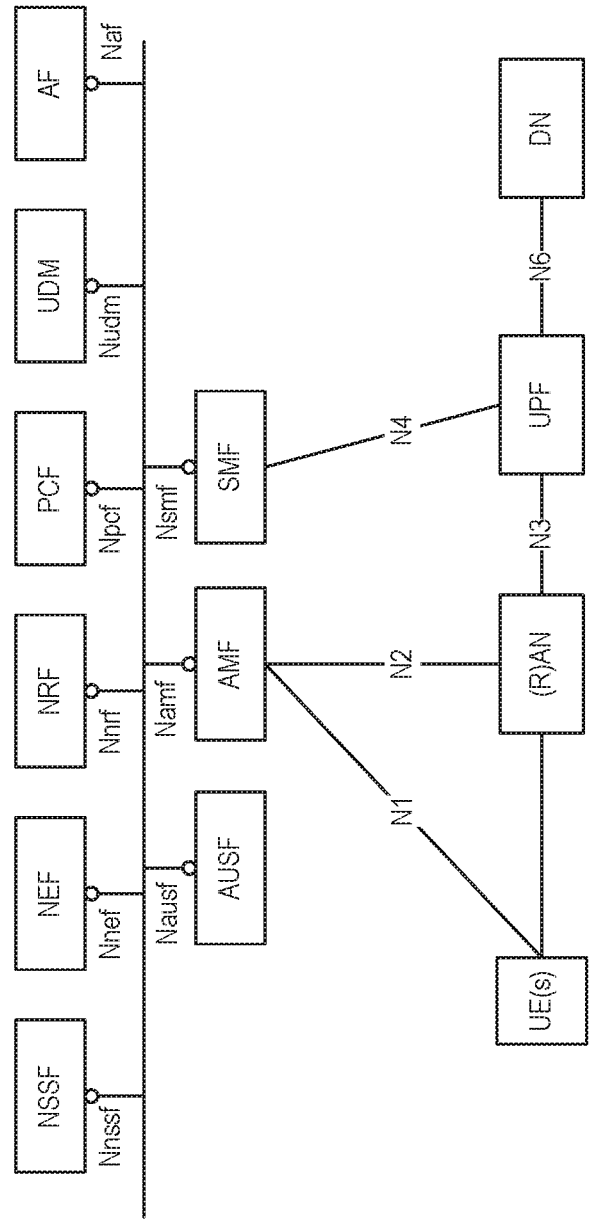
FIG. 8 illustrates a 5G network architecture using service-based interfaces between the NFs in the control plane, instead of the point-to-point reference points/interfaces used in the 5G network architecture of FIG. 7.

FIG. 8 illustrates a 5G network architecture using service-based interfaces between the NFs in the control plane, instead of the point-to-point reference points/interfaces used in the 5G network architecture of FIG. 7. However, the NFs described above with reference to FIG. 7 correspond to the NFs shown in FIG. 8. The service(s) etc. that a NF provides to other authorized NFs can be exposed to the authorized NFs through the service-based interface. In FIG. 8 the service based interfaces are indicated by the letter "N" followed by the name of the NF, e.g., Namf for the service based interface of the AMF and Nsmf for the service based interface of the SMF etc. The Network Exposure Function (NEF) and the Network Function (NF) Repository Function (NRF) in FIG. 8 are not shown in FIG. 7 discussed above. However, it should be clarified that all NFs depicted in FIG. 7 can interact with the NEF and the NRF of FIG. 8 as necessary, though not explicitly indicated in FIG. 7.

Some properties of the NFs shown in FIGS. 7 and 8 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

5G NR utilizes Orthogonal Frequency-Division Multiple Access (OFDMA) as the multi-access scheme in the uplink. The transmissions from different UEs in a cell are time-aligned at the 5G NodeB (gNB) to maintain uplink orthogonality. Time alignment is achieved by using different Timing Advance (TA) values at different UEs to compensate for their different propagation delays. The required TA for a UE is roughly equal to the round-trip delay between the UE and gNB.

For the initial TA, after a UE has synchronized in the downlink and acquired certain system information, the UE transmits a random-access preamble (known as Message 1 (Msg1)) on Physical Random-Access Channel (PRACH). The gNB estimates the uplink timing from the received random-access preamble and responds Message 2 (Msg2) with a TA command. This allows the establishment of initial TA for the UE.

The propagation delays in terrestrial mobile systems are usually less than 1 ms. In contrast, the propagation delays in NTN are much longer, ranging from several milliseconds to hundreds of milliseconds depending on the altitudes of the spaceborne or airborne platforms in NTN. Dealing with such long propagation delays requires modifications of many timing aspects in NR from physical layer to higher layers, including the TA mechanism.

There are two types of timing advance mechanisms, which are referred to as large TA and small TA.

Figure 4:
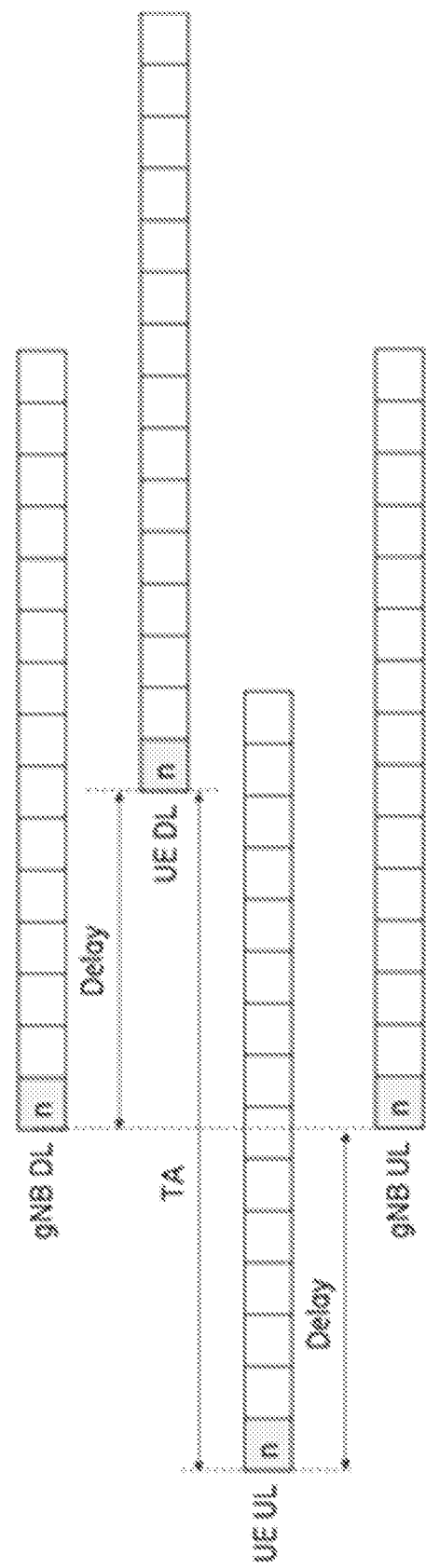
FIG. 4 illustrates a large Timing Advance (TA) compensating full RTT.

With large TA, each UE has a TA equal to its round-trip time and thus fully compensates its RTT. This is illustrated in FIG. 4 which is an illustration of large TA compensating full RTT. Accordingly, gNB DL-UL frame timings are aligned.

Figure 5:
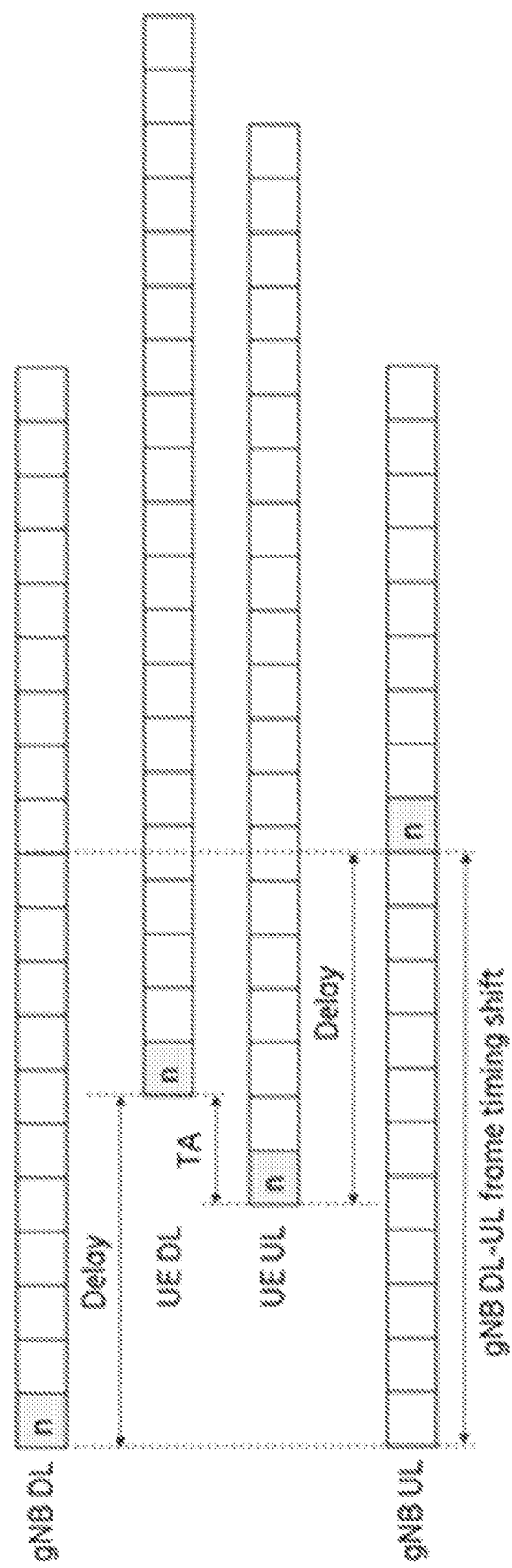
FIG. 5 illustrates, with small TA, gNB needs to manage a DL-UL frame timing shift on the order of the reference RTT.

With small TA, each UE has a TA equal to its round-trip time minus a reference round-trip time, i.e., differential RTT. For example, the reference RTT can be the minimum RTT of a cell, and thus the differential RTT of any UE in the cell is always non-negative. The maximum differential RTT depends on the cell size and may range from sub-millisecond to a few milliseconds. With small TA, gNB needs to manage a DL-UL frame timing shift on the order of the reference RTT, as illustrated in FIG. 5.

There currently exist certain challenges. In NR Rel-15, the CSI reference resource definitions are designed to be suitable for terrestrial radio propagation environment where the round-trip delay is usually within 1 ms. However, in NTN scenarios, depending on whether small TA or large TA is used, the DL-UL frame timings at the gNB may or may not be aligned. Furthermore, the DL-UL frame timings at the UE will not be aligned due to the application of large or small TA. In addition, the TA value applied by the UE is UE specific as different UEs may have a different RTT. Furthermore, the range of RTT also depends on different NTN scenarios such as LEO/MEO/GEO. The current CSI reference resource definitions in NR Rel-15 do not take into account such DL-UL frame misalignments and the application of large TAs prevalent In NTN scenarios. Hence, there is an open problem on how to determine CSI reference resource for NTN scenarios.

Systems and methods of reference resource determination are provided. In some embodiments, a method performed by a wireless device for determining a reference resource includes: receiving, from a network node, an indication of at least one configurable offset value to compensate for a Round Trip Time (RTT) value; receiving, from the network node, one or more configurations of resources for channel measurement and one or more configurations of measurement reporting; and determining, a reference resource for a measurement report to be reported in slot n' using the at least one configurable offset received from the network node. In some embodiments, this includes configurations of Channel State Information Reference Signals (CSI-RS) resources for channel measurement and/or CSI reporting. In this way, CSI reporting with proper CSI reference resource determination is enabled. In some embodiments, this is suitable for Non-Terrestrial Network (NTN) scenarios where the RTT can be in the order of 10s to 100s of milliseconds.

An example is next provided to illustrate the problem. Consider an example where the DL and the UL numerologies are 15 kHz (i.e., $\mu_{DL}=\mu_{UL}=0$). Then for a CSI report in uplink slot n' the CSI reference resource is given by a single downlink slot n−$n_{CSI\_ref}$. Note that when the DL and UL numerologies are the same, $$n = \left\lfloor n' \cdot \frac{2^{\mu_{DL}}}{2^{\mu_{UL}}} \right\rfloor = n'.$$

In this example, periodic CSI reporting is assumed with a single CSI-RS resource being configured for channel measurement.

Figure 9:
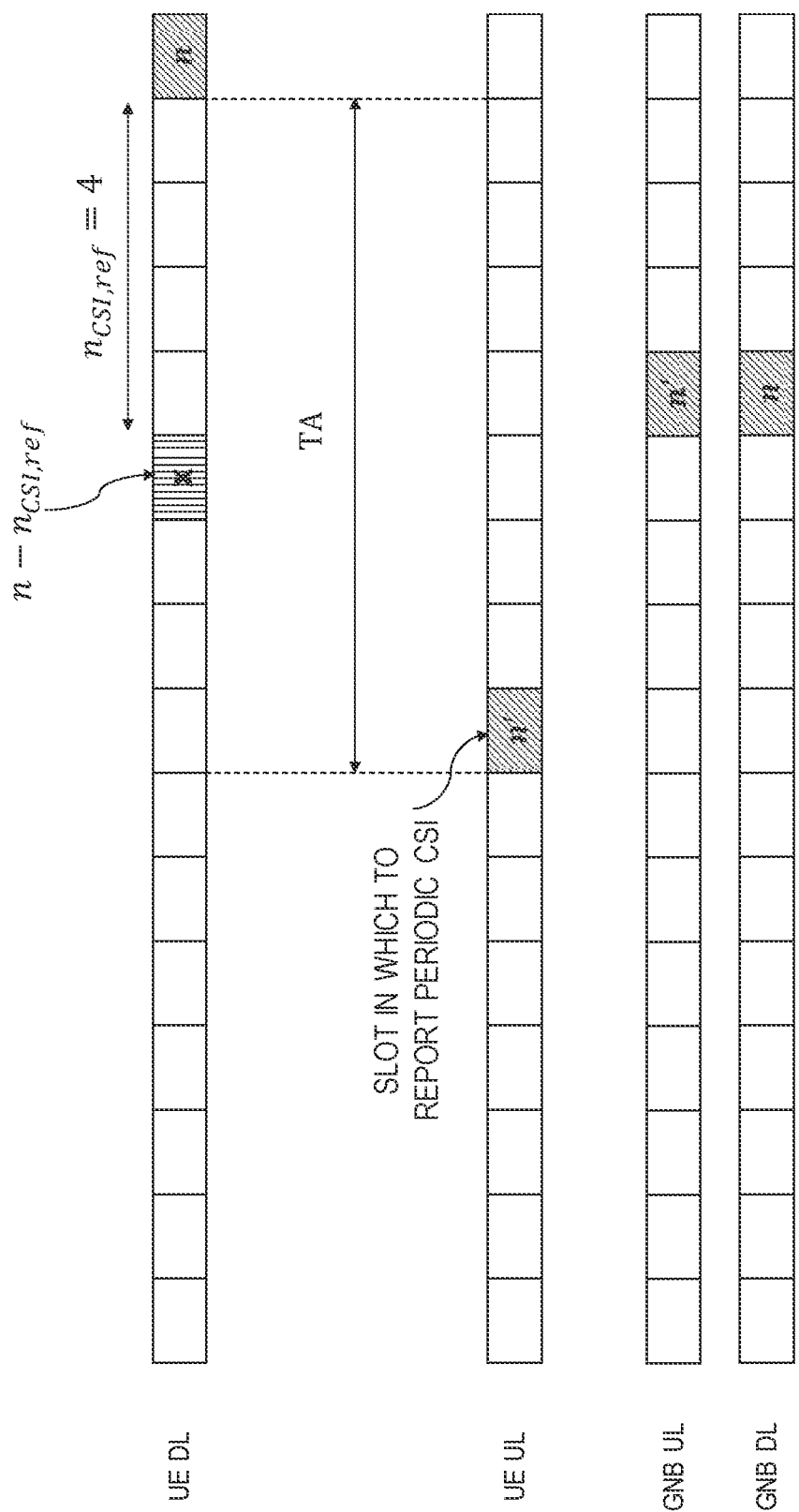
FIG. 9 shows the case when the existing CSI reference resource definition in NR Rel-15 is used in an NTN scenario with a TA of eight slots.

FIG. 9 shows the case when the existing CSI reference resource definition in NR Rel-15 is used in an NTN scenario with a TA of eight slots. Recall that n=n' in this example since the UL and DL numerologies are the same. Also shown in the figure are the UL and DL frame timings at the gNB. In this case, using the existing CSI reference resource definition in NR Rel-15 would result in the CSI reference resource at UE's DL slot n−$n_{CSI\_ref}$ happening much later than UE's UL slot n' in which a UE needs to send a periodic CSI. This would mean the UE would possibly have to perform CSI measurement in a future slot in order to report the CSI in the current slot, which is not possible in practice.

Figure 10:
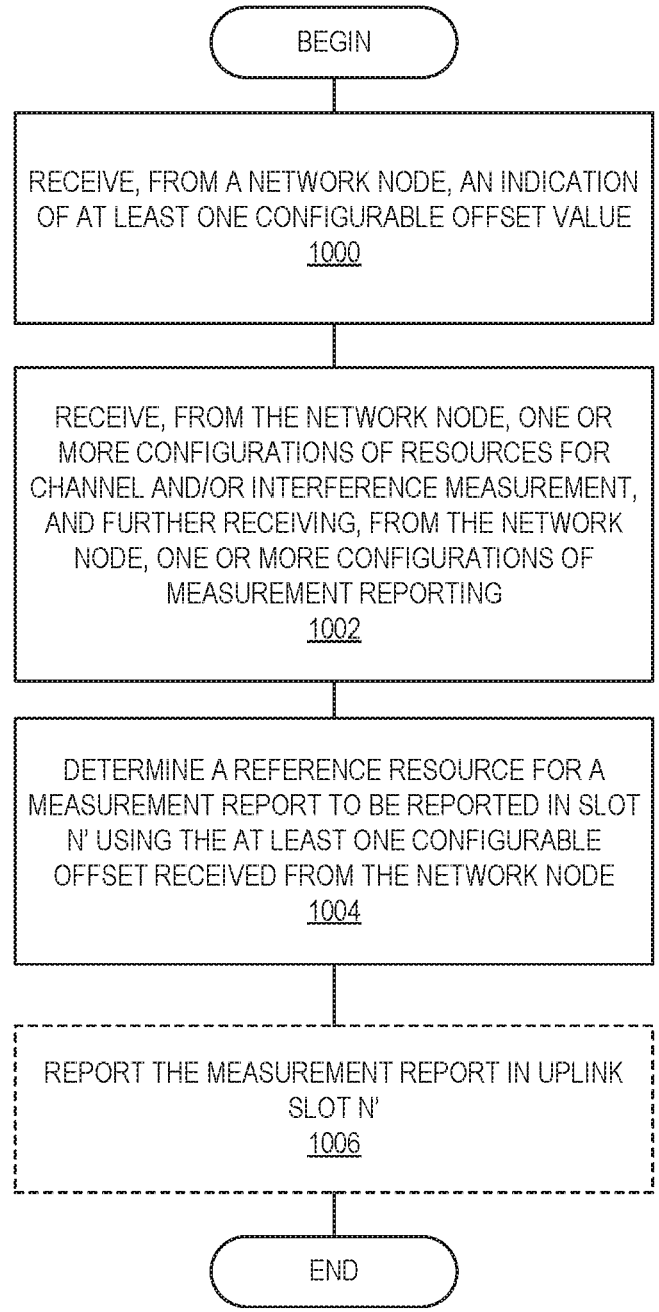
FIG. 10 illustrates a method performed by a wireless device for determining a reference resource, according to some embodiments of the current disclosure.

Some embodiments of this disclosure propose a solution for determining CSI reference resource for a CSI report. FIG. 10 illustrates an exemplary embodiment. In some embodiments, a method performed by a wireless device for determining a reference resource includes receiving, from a network node, an indication of at least one configurable offset value (step 1000); receiving, from the network node, one or more configurations of resources for channel and/or interference measurement (step 1002), and further receiving, from the network node, one or more configurations of measurement reporting; and determining, a reference resource for a measurement report to be reported in slot n' using the at least one configurable offset received from the network node (step 1004). In some embodiments, the method also includes reporting the measurement report in uplink slot n' (step 1006).

Figure 11:
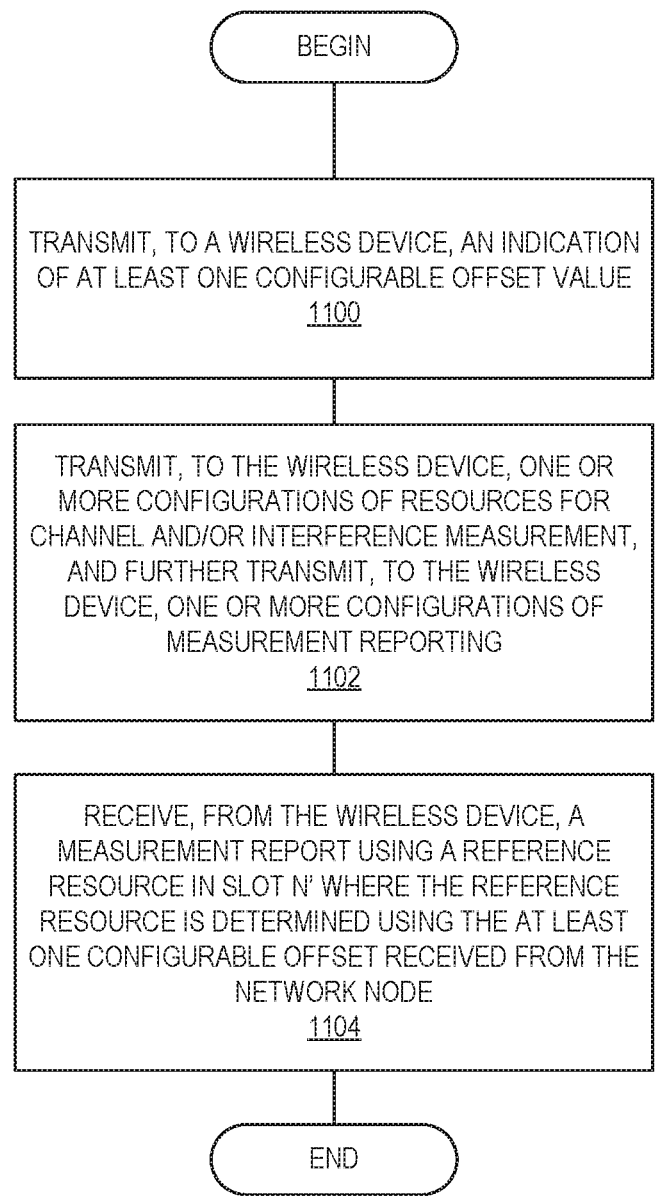
FIG. 11 illustrates a method performed by a base station for determining a reference resource, according to some embodiments of the current disclosure.

Some embodiments of this disclosure propose a solution for determining CSI reference resource for a CSI report. FIG. 11 illustrates an exemplary embodiment. In some embodiments, a method performed by a base station for determining a reference resource includes one or more of: transmitting, to a wireless device, an indication of at least one configurable offset value (step 1100); transmitting, to the wireless device, one or more configurations of resources for channel and/or interference measurement, and further transmitting, to the wireless device, one or more configurations of measurement reporting (step 1102); and receiving, from the wireless device, a measurement report using a reference resource in slot n' where the reference resource is determined using the at least one configurable offset received from the network node (step 1104).

To determine a CSI reference resource suitable for NTN scenarios, the first step is for the UE to determine an offset value that will compensate for the full RTT or the differential RTT. In some embodiments, the UE will receive an indication from the gNB of an offset value. The offset value may be configurable to cover different NTN scenarios such as LEO/MEO/GEO. Furthermore, the configurable offset values may be dependent on different NR numerologies. The configurable offset value will compensate for the full RTT or the differential RTT. In some variants of this embodiment, the configurable offset is UE specifically configured to the UE by the gNB (for example, via RRC signaling). In some other variants of the embodiment, the indication of the offset value may be via broadcasting where the gNB broadcasts an offset value. This offset value broadcasted by the gNB may compensate for the common RTT. In some other embodiments, the gNB may indicate to the UE one offset via broadcasting to compensate for the common RTT and a second offset via higher layer signaling to compensate for differential RTT. If multiple such offset values are indicated by the gNB, then the UE will determine a combined offset by summing the first offset and the second offset.

In the second step, the UE receives configuration of CSI-RS resource(s) for channel measurement, and or CSI-IM resource(s) for interference measurement.

In the third step, for a CSI report to be reported in UL slot n' including the effect of the one way delay, the UE determines the CSI reference resource in a downlink slot n−$n_{CSI\_ref}$, taking into account the offset value determined from the 1$^{st}$ step, where $$n = \left\lfloor n' \cdot \frac{2^{\mu_{DL}}}{2^{\mu_{UL}}} \right\rfloor$$

and $\mu_{DL}$ and $\mu_{UL}$ are the subcarrier spacing configurations for DL and UL, respectively.

In the fourth step, the UE reports the CSI in UL slot n' including the effect of the one way delay.

Figure 12:
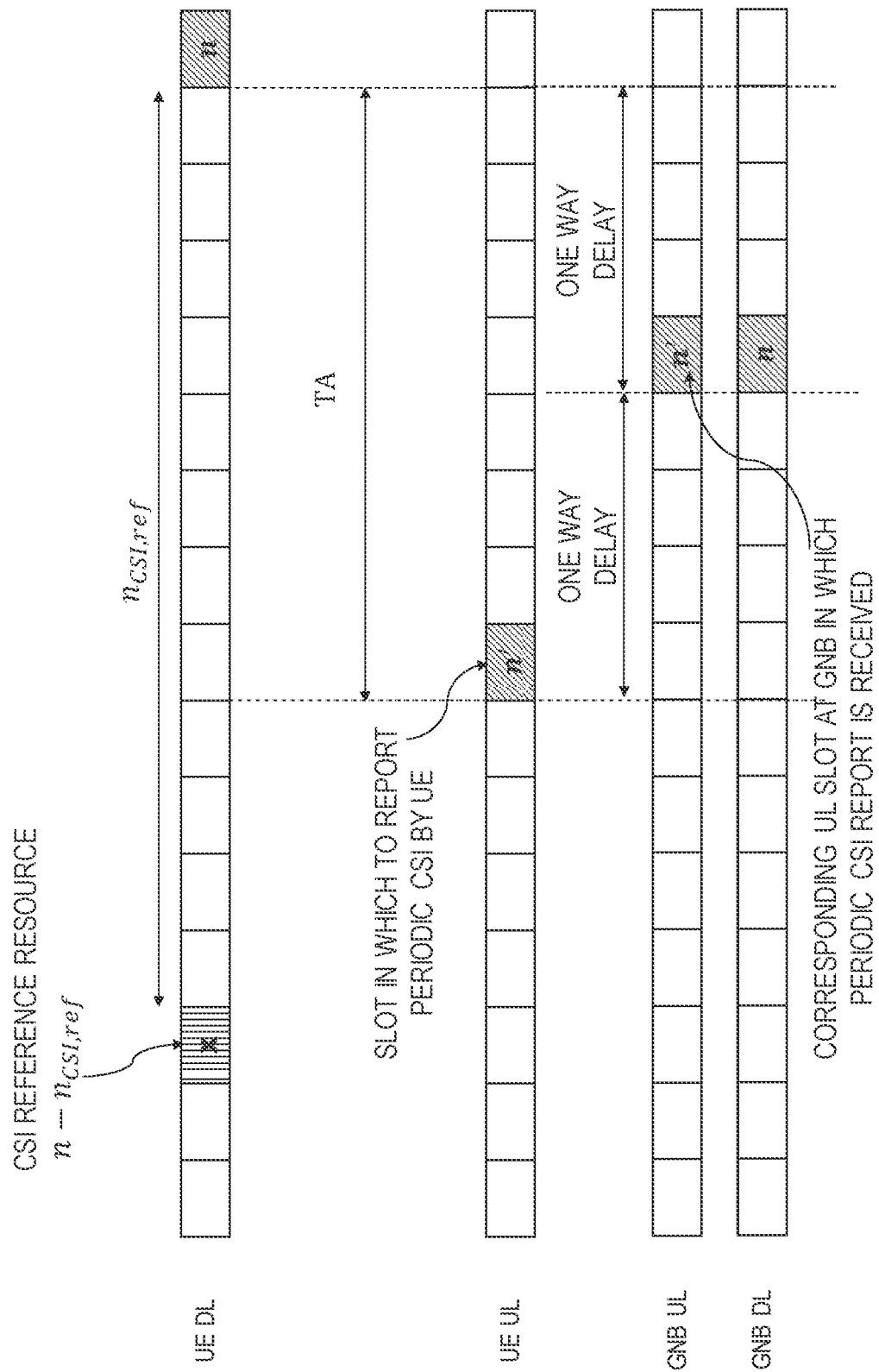
FIG. 12 below, where the same subcarrier spacing is used for both DL and UL (i.e., n=n'), according to some embodiments of the current disclosure.

An example is shown in FIG. 12 below, where the same subcarrier spacing is used for both DL and UL (i.e., n=n'). Note that for a CSI report to reach the gNB at UL slot n', the UE needs to send the CSI report four slots earlier to include the effect of the one way delay. Note that RTT=8 slots in this example, hence four slots correspond to the one way delay between UE and gNB. The DL reference resource for the CSI report is in UE's DL slot n−$n_{CSI\_ref}$.

In the next few sections, detailed embodiments for step 3 are provided further discussing embodiments of how to determine the CSI reference resource by taking into account the offset value determined from step 1.

CSI Reference Resource Determination for Periodic and Semi-Persistent CSI Reporting In this embodiment, the CSI reference resource for periodic and semi-persistent CSI reporting is determined as outlined below. The value $n_{CSI\_ref}$ that determines the CSI reference resource in the time domain is given as follows for periodic and semi-persistent CSI reporting:

if a single CSI-RS resource is configured for channel measurement, $n_{CSI\_ref}$ is the smallest value greater than or equal to $4 \cdot 2^{\mu_{DL}} + K_{offset}$, such that it corresponds to a valid downlink slot, or if multiple CSI-RS resources are configured for channel measurement, $n_{CSI\_ref}$ is the smallest value greater than or equal to $5 \cdot 2^{\mu_{DL}} + K_{offset}$, such that it corresponds to a valid downlink slot.

Note that $K_{offset}$ is the time offset (e.g., in symbols or in slots) Indicated by the gNB to the UE, or is derived from one or multiple time offset related parameter or parameters signaled by the gNB.

Figure 13:
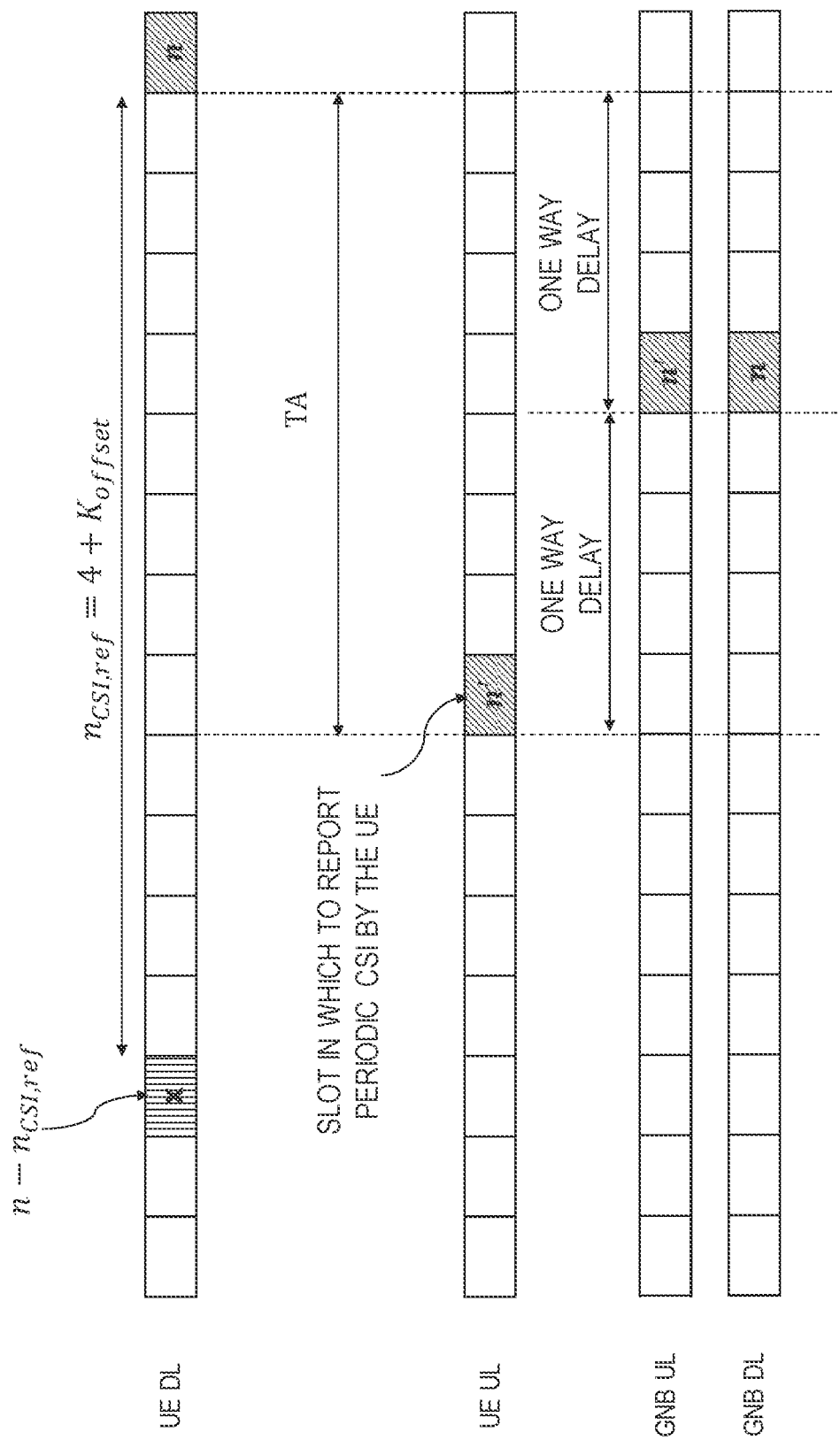
FIG. 13 shows the case when the proposed CSI reference resource determination method is used in an NTN scenario with a one way delay of eight slots, according to some embodiments of the current disclosure.

FIG. 13 shows the case when the proposed CSI reference resource determination method is used in an NTN scenario with a one way delay of eight slots. As in the previous examples, the same subcarrier spacing is used for both DL and UL (i.e., n=n') for this example. In this example, the UE receives an indication of an offset $K_{offset}$ value equal to eight slots. The UE uses this offset in determining the CSI reference resource for a CSI report to be reported in UE's UL slot n'. As can be seen from FIG. 13, the proposed solution results in the CSI reference resource happening much earlier than the slot in which the UE has to report periodic CSI. Hence, the proposed solution enables CSI reporting with proper CSI reference resource determination in NTN scenarios.

At the gNB, when it receives a CSI report in UL slot n', it knows the reference resource for the report is in DL slot $-n_{CSI\_ref}$.

CSI Reference Resource Determination for Aperiodic CSI Reporting

In this embodiment, the CSI reference resource for aperiodic reporting is determined as outlined below. The value $n_{CSI\_ref}$ that determines the CSI reference resource in the time domain is given as follows for aperiodic CSI reporting:

If the UE is indicated by the DCI to report CSI in a future uplink slot and when aperiodic CSI-RS is used for channel measurement for the triggered CSI report, $n_{CSI\_ref}$ the smallest value greater than or equal to $Z'/N_{symb}^{slot} + K_{offset}$, such that slot $n - n_{CSI\_ref}$ corresponds to a valid downlink slot. Here, $K_{offset}$ is the offset indicated by the gNB to the UE, Z' corresponds to the delay requirement in symbols between the end of the last symbol in time of the latest of: aperiodic CSI-RS resource for channel measurements, aperiodic CSI-IM used for interference measurements, and aperiodic NZP CSI-RS for interference measurement, and the first uplink symbol to carry the corresponding CSI report including the effect of the one way delay, and $N_{symb}^{slot}$ denotes the number of symbols per slot.

If the UE is Indicated by the DCI to report CSI in a future uplink slot and when periodic or semi-persistent CSI-RS is used for channel measurement for the triggered CSI report, $n_{CSI\_ref}$ is the smallest value greater than or equal to $Z/N_{symb}^{slot} + K_{offset}$, such that slot $n - n_{CSI\_ref}$ corresponds to a valid downlink slot. Here Z corresponds to the delay requirement in symbols between the end of the last symbol of the PDCCH triggering the CSI report and the first uplink symbol to carry the corresponding CSI report including the effect of the one way delay.

An Alternate Embodiment

An alternative to the general embodiment above is now given. In this embodiment, the UE first receives configuration of CSI-RS resource(s) for channel measurement, and or CSI-IM resource(s) for interference measurement.

Figure 14:
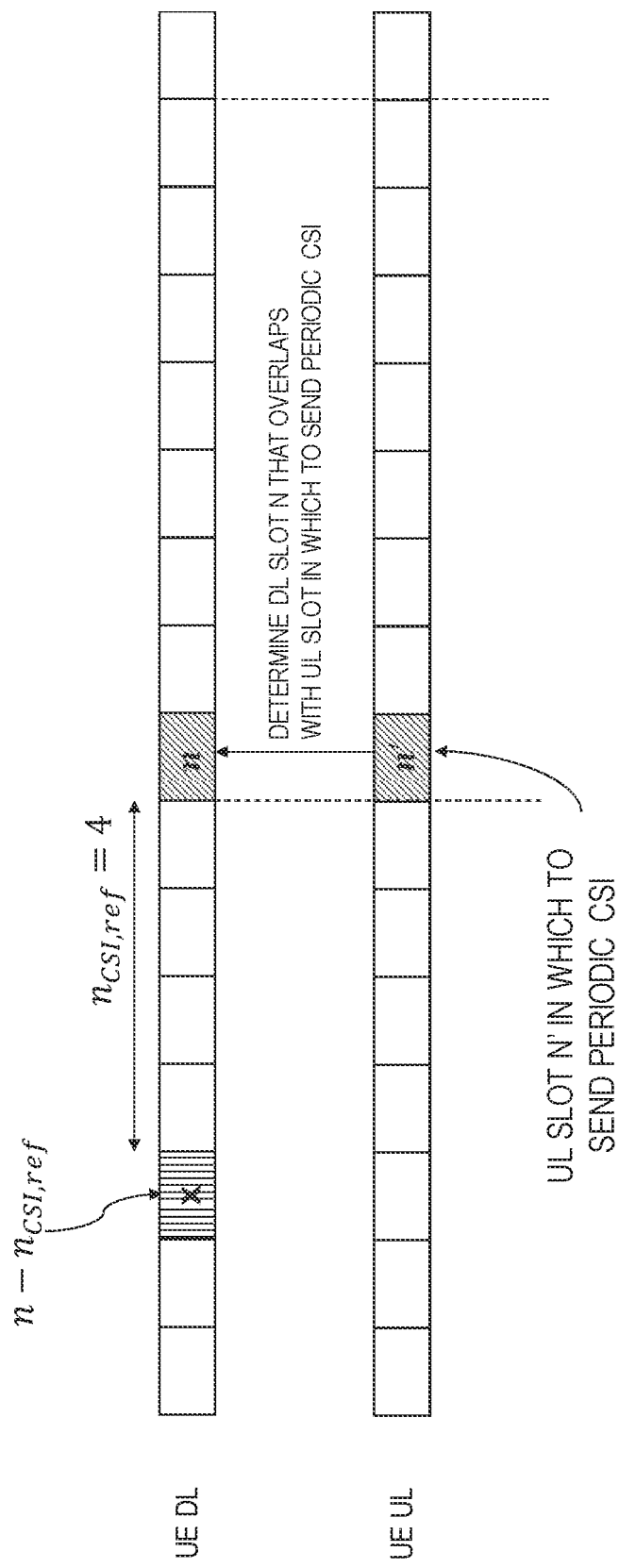
FIG. 14 shows an example on how the UE determines the DL slot n from the UL slot n' according to some embodiments of the current disclosure.

In the second step, for a CSI report to be reported in UL slot n'(UL slot n' here is defined from UE's perspective), the UE first determines the DL slot n with overlaps with the UL slot n'. The overlap may be a partial overlap or a full overlap. In case, the DL and UL subcarrier spacings are different, the DL slot n may be the first or the last among the DL slots that overlap with UL slot n'. FIG. 14 shows an example on how the UE determines the DL slot n from the UL slot n'. In this example, the DL slot n is determined as the slot that overlaps with UL slot n'.

Once the DL slot n is determined, the CSI reference resource is determined to be in DL slot $n - n_{CSI\_ref}$, where $n_{CSI\_ref}$ for this alternative embodiment is defined to be the same as in NR Rel-15 (see section 2.1.3)

Figure 15:
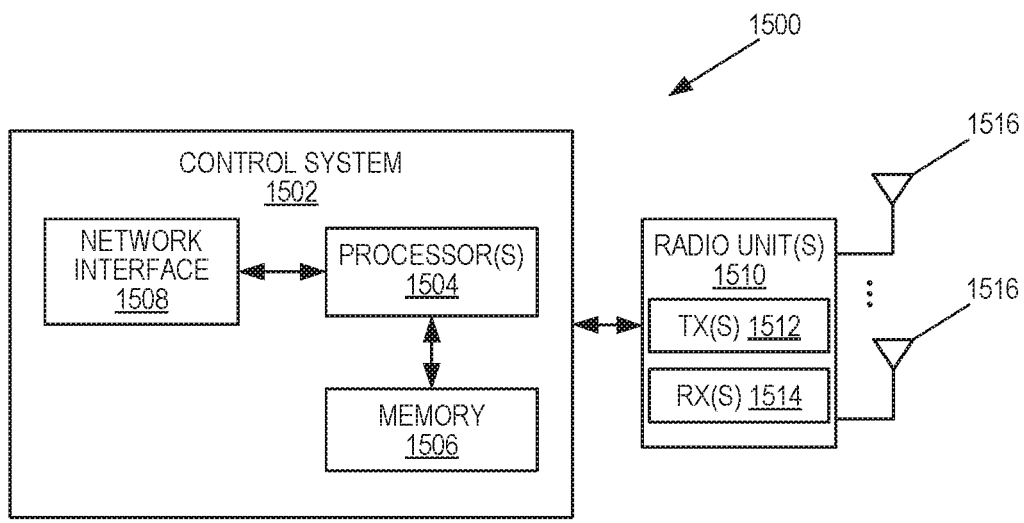
FIG. 15 is a schematic block diagram of a network node according to some embodiments of the present disclosure.

FIG. 15 is a schematic block diagram of a radio access node 1500 according to some embodiments of the present disclosure. The radio access node 1500 may be, for example, a base station 602 or 606. As illustrated, the radio access node 1500 includes a control system 1502 that includes one or more processors 1504 (e.g., Central Processing Units (CPUs), Application Specific Integrated Circuits (ASICs), Field Programmable Gate Arrays (FPGAs), and/or the like), memory 1506, and a network interface 1508. The one or more processors 1504 are also referred to herein as processing circuitry. In addition, the radio access node 1500 includes one or more radio units 1510 that each includes one or more transmitters 1512 and one or more receivers 1514 coupled to one or more antennas 1516. The radio units 1510 may be referred to or be part of radio interface circuitry. In some embodiments, the radio unit(s) 1510 is external to the control system 1502 and connected to the control system 1502 via, e.g., a wired connection (e.g., an optical cable). However, in some other embodiments, the radio unit(s) 1510 and potentially the antenna(s) 1516 are integrated together with the control system 1502. The one or more processors 1504 operate to provide one or more functions of a radio access node 1500 as described herein. In some embodiments, the function(s) are implemented in software that is stored, e.g., in the memory 1506 and executed by the one or more processors 1504.

Figure 16:
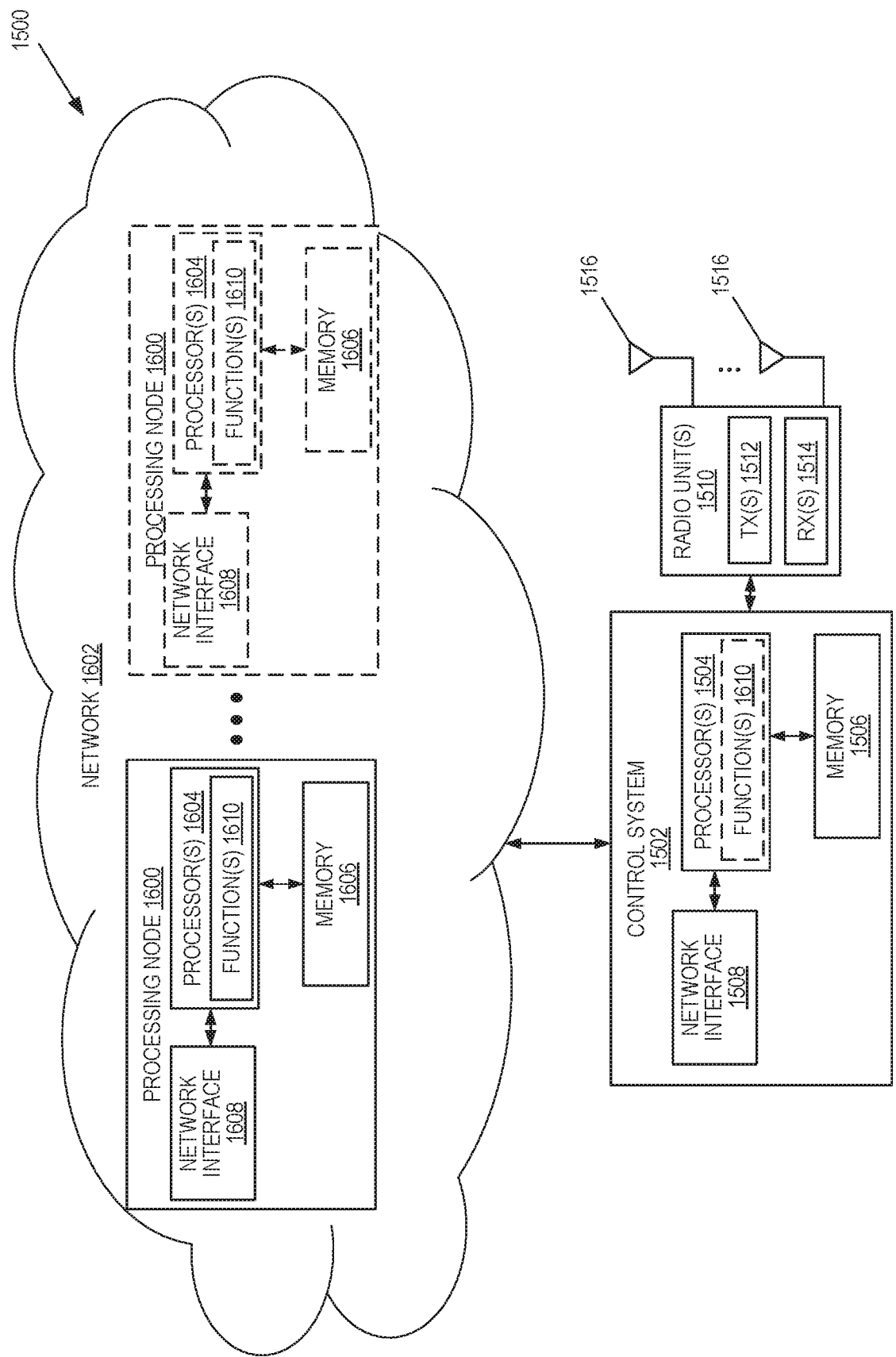
FIG. 16 is a schematic block diagram that illustrates a virtualized embodiment of the radio access node, according to some embodiments of the present disclosure.

FIG. 16 is a schematic block diagram that illustrates a virtualized embodiment of the radio access node 1500 according to some embodiments of the present disclosure. This discussion is equally applicable to other types of network nodes. Further, other types of network nodes may have similar virtualized architectures.

As used herein, a "virtualized" radio access node is an implementation of the radio access node 1500 in which at least a portion of the functionality of the radio access node 1500 is implemented as a virtual component(s) (e.g., via a virtual machine(s) executing on a physical processing node(s) in a network(s)). As illustrated, in this example, the radio access node 1500 includes the control system 1502 that includes the one or more processors 1504 (e.g., CPUs, ASICs, FPGAs, and/or the like), the memory 1506, and the network interface 1508 and the one or more radio units 1510 that each includes the one or more transmitters 1512 and the one or more receivers 1514 coupled to the one or more antennas 1516, as described above. The control system 1502 is connected to the radio unit(s) 1510 via, for example, an optical cable or the like. The control system 1502 is connected to one or more processing nodes 1600 coupled to or included as part of a network(s) 1602 via the network interface 1508. Each processing node 1600 includes one or more processors 1604 (e.g., CPUs, ASICs, FPGAs, and/or the like), memory 1606, and a network interface 1608.

In this example, functions 1610 of the radio access node 1500 described herein are implemented at the one or more processing nodes 1600 or distributed across the control system 1502 and the one or more processing nodes 1600 in any desired manner. In some particular embodiments, some or all of the functions 1610 of the radio access node 1500 described herein are implemented as virtual components executed by one or more virtual machines implemented in a virtual environment(s) hosted by the processing node(s) 1600. As will be appreciated by one of ordinary skill in the art, additional signaling or communication between the processing node(s) 1600 and the control system 1502 is used in order to carry out at least some of the desired functions 1610. Notably, in some embodiments, the control system 1502 may not be included, in which case the radio unit(s) 1510 communicate directly with the processing node(s) 1600 via an appropriate network interface(s).

In some embodiments, a computer program including instructions which, when executed by at least one processor, causes the at least one processor to carry out the functionality of radio access node 1500 or a node (e.g., a processing node 1600) implementing one or more of the functions 1610 of the radio access node 1500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
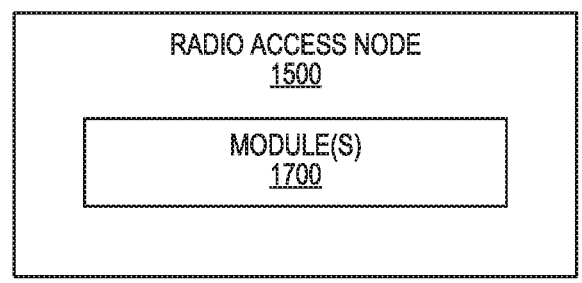
FIG. 17 is a schematic block diagram of the network node, according to some other embodiments of the present disclosure.

FIG. 17 is a schematic block diagram of the radio access node 1500 according to some other embodiments of the present disclosure. The radio access node 1500 includes one or more modules 1700, each of which is implemented in software. The module(s) 1700 provide the functionality of the radio access node 1500 described herein. This discussion is equally applicable to the processing node 1600 of FIG. 16 where the modules 1700 may be implemented at one of the processing nodes 1600 or distributed across multiple processing nodes 1600 and/or distributed across the processing node(s) 1600 and the control system 1502.

Figure 18:
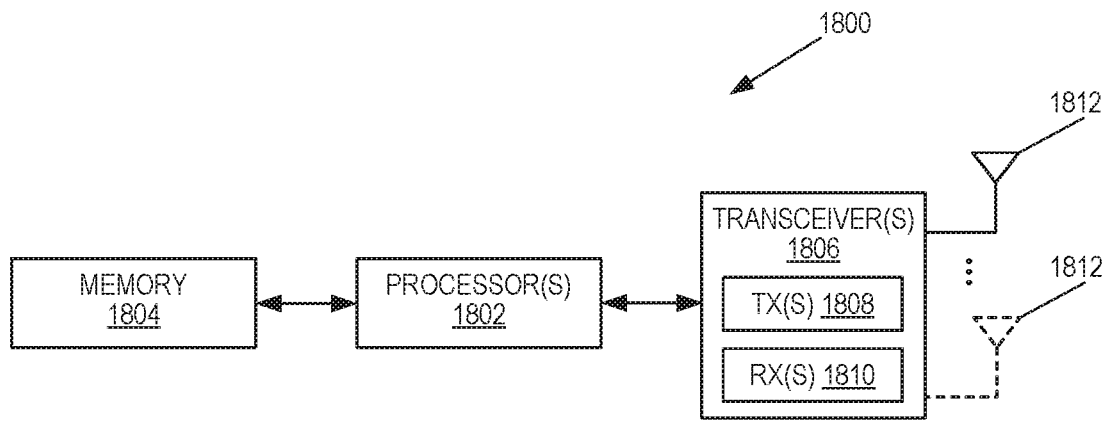
FIG. 18 is a schematic block diagram of a UE, according to some embodiments of the present disclosure.

FIG. 18 is a schematic block diagram of a UE 1800 according to some embodiments of the present disclosure. As illustrated, the UE 1800 includes one or more processors 1802 (e.g., CPUs, ASICs, FPGAs, and/or the like), memory 1804, and one or more transceivers 1806 each including one or more transmitters 1808 and one or more receivers 1810 coupled to one or more antennas 1812. The transceiver(s) 1806 includes radio-front end circuitry connected to the antenna(s) 1812 that is configured to condition signals communicated between the antenna(s) 1812 and the processor(s) 1802, as will be appreciated by on of ordinary skill in the art. The processors 1802 are also referred to herein as processing circuitry. The transceivers 1806 are also referred to herein as radio circuitry. In some embodiments, the functionality of the UE 1800 described above may be fully or partially implemented in software that is, e.g., stored in the memory 1804 and executed by the processor(s) 1802. Note that the UE 1800 may include additional components not illustrated in FIG. 18 such as, e.g., one or more user interface components (e.g., an input/output interface including a display, buttons, a touch screen, a microphone, a speaker(s), and/or the like and/or any other components for allowing input of information into the UE 1800 and/or allowing output of information from the UE 1800), a power supply (e.g., a battery and associated power circuitry), etc.

In some embodiments, a computer program including instructions which, when executed by at least one processor, causes the at least one processor to carry out the functionality of the UE 1800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 19:
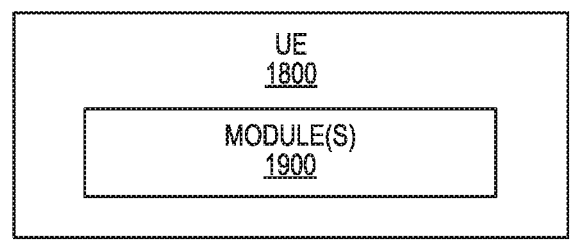
FIG. 19 is a schematic block diagram of the UE, according to some embodiments of the present disclosure.

FIG. 19 is a schematic block diagram of the UE 1800 according to some other embodiments of the present disclosure. The UE 1800 includes one or more modules 1900, each of which is implemented in software. The module(s) 1900 provide the functionality of the UE 1800 described herein.

Figure 20:
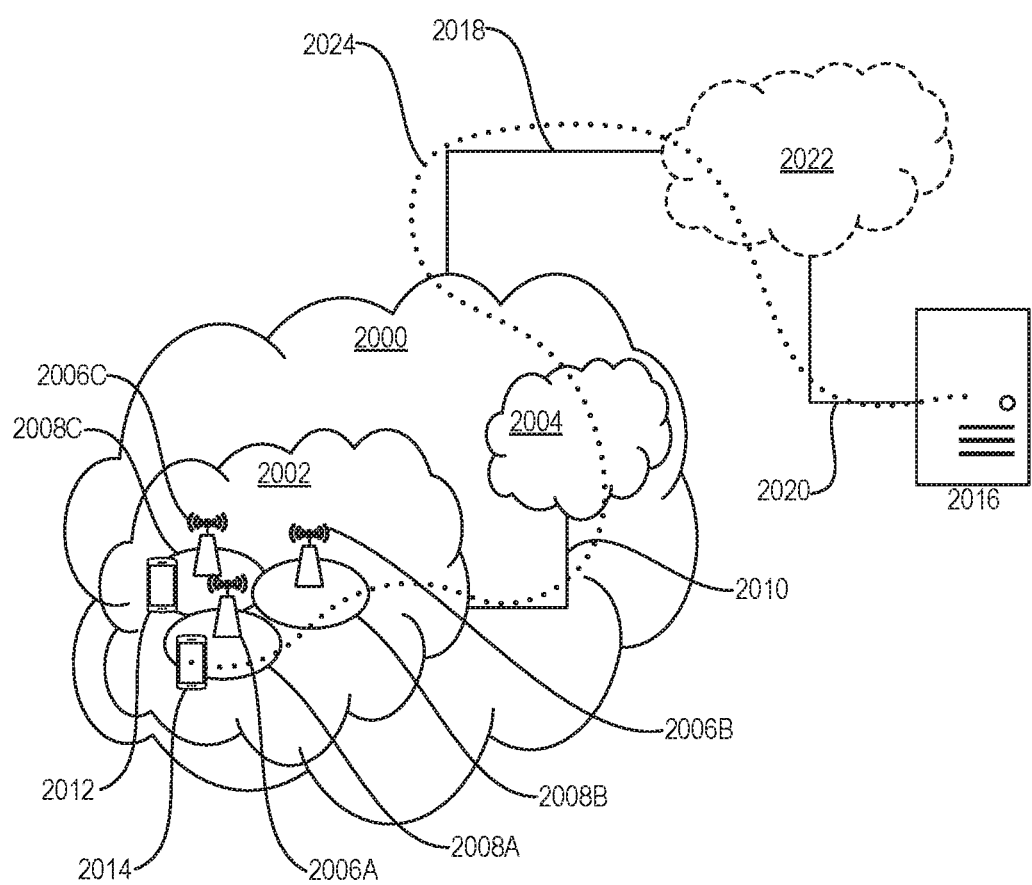
FIGS. 20 and 21 illustrate examples of a cellular communications system, according to some embodiments of the present disclosure.

With reference to FIG. 20, in accordance with an embodiment, a communication system includes a telecommunication network 2000, such as a 3GPP-type cellular network, which comprises an access network 2002, such as a RAN, and a core network 2004. The access network 2002 comprises a plurality of base stations 2006A, 2006B, 2006C, such as Node Bs, eNBs, gNBs, or other types of wireless Access Points (APs), each defining a corresponding coverage area 2008A, 2008B, 2008C. Each base station 2006A, 2006B, 2006C is connectable to the core network 2004 over a wired or wireless connection 2010. A first UE 2012 located in coverage area 2008C is configured to wirelessly connect to, or be paged by, the corresponding base station 2006C. A second UE 2014 in coverage area 2008A is wirelessly connectable to the corresponding base station 2006A. While a plurality of UEs 2012, 2014 are illustrated in this example, the disclosed embodiments are equally applicable to a situation where a sole UE is in the coverage area or where a sole UE is connecting to the corresponding base station 2006.

The telecommunication network 2000 is itself connected to a host computer 2016, which may be embodied in the hardware and/or software of a standalone server, a cloud-implemented server, a distributed server, or as processing resources in a server farm. The host computer 2016 may be under the ownership or control of a service provider, or may be operated by the service provider or on behalf of the service provider. Connections 2018 and 2020 between the telecommunication network 2000 and the host computer 2016 may extend directly from the core network 2004 to the host computer 2016 or may go via an optional intermediate network 2022. The intermediate network 2022 may be one of, or a combination of more than one of, a public, private, or hosted network; the intermediate network 2022, if any, may be a backbone network or the Internet; in particular, the intermediate network 2022 may comprise two or more sub-networks (not shown).

The communication system of FIG. 20 as a whole enables connectivity between the connected UEs 2012, 2014 and the host computer 2016. The connectivity may be described as an Over-the-Top (OTT) connection 2024. The host computer 2016 and the connected UEs 2012, 2014 are configured to communicate data and/or signaling via the OTT connection 2024, using the access network 2002, the core network 2004, any intermediate network 2022, and possible further infrastructure (not shown) as intermediaries. The OTT connection 2024 may be transparent in the sense that the participating communication devices through which the OTT connection 2024 passes are unaware of routing of uplink and downlink communications. For example, the base station 2006 may not or need not be informed about the past routing of an incoming downlink communication with data originating from the host computer 2016 to be forwarded (e.g., handed over) to a connected UE 2012. Similarly, the base station 2006 need not be aware of the future routing of an outgoing uplink communication originating from the UE 2012 towards the host computer 2016.

Example implementations, in accordance with an embodiment, of the UE, base station, and host computer discussed in the preceding paragraphs will now be described with reference to FIG. 21. In a communication system 2100, a host computer 2102 comprises hardware 2104 including a communication interface 2106 configured to set up and maintain a wired or wireless connection with an interface of a different communication device of the communication system 2100. The host computer 2102 further comprises processing circuitry 2108, which may have storage and/or processing capabilities. In particular, the processing circuitry 2108 may comprise one or more programmable processors, ASICs, FPGAs, or combinations of these (not shown) adapted to execute instructions. The host computer 2102 further comprises software 2110, which is stored in or accessible by the host computer 2102 and executable by the processing circuitry 2108. The software 2110 includes a host application 2112. The host application 2112 may be operable to provide a service to a remote user, such as a UE 2114 connecting via an OTT connection 2116 terminating at the UE 2114 and the host computer 2102. In providing the service to the remote user, the host application 2112 may provide user data which is transmitted using the OTT connection 2116.

The communication system 2100 further includes a base station 2118 provided in a telecommunication system and comprising hardware 2120 enabling it to communicate with the host computer 2102 and with the UE 2114. The hardware 2120 may include a communication interface 2122 for setting up and maintaining a wired or wireless connection with an interface of a different communication device of the communication system 2100, as well as a radio interface 2124 for setting up and maintaining at least a wireless connection 2126 with the UE 2114 located in a coverage area (not shown in FIG. 21) served by the base station 2118. The communication interface 2122 may be configured to facilitate a connection 2128 to the host computer 2102. The connection 2128 may be direct or it may pass through a core network (not shown in FIG. 21) of the telecommunication system and/or through one or more intermediate networks outside the telecommunication system. In the embodiment shown, the hardware 2120 of the base station 2118 further includes processing circuitry 2130, which may comprise one or more programmable processors, ASICs, FPGAs, or combinations of these (not shown) adapted to execute instructions. The base station 2118 further has software 2132 stored internally or accessible via an external connection.

The communication system 2100 further includes the UE 2114 already referred to. The UE's 2114 hardware 2134 may include a radio interface 2136 configured to set up and maintain a wireless connection 2126 with a base station serving a coverage area in which the UE 2114 is currently located. The hardware 2134 of the UE 2114 further includes processing circuitry 2138, which may comprise one or more programmable processors, ASICs, FPGAs, or combinations of these (not shown) adapted to execute instructions. The UE 2114 further comprises software 2140, which is stored in or accessible by the UE 2114 and executable by the processing circuitry 2138. The software 2140 includes a client application 2142. The client application 2142 may be operable to provide a service to a human or non-human user via the UE 2114, with the support of the host computer 2102. In the host computer 2102, the executing host application 2112 may communicate with the executing client application 2142 via the OTT connection 2116 terminating at the UE 2114 and the host computer 2102. In providing the service to the user, the client application 2142 may receive request data from the host application 2112 and provide user data in response to the request data. The OTT connection 2116 may transfer both the request data and the user data. The client application 2142 may interact with the user to generate the user data that it provides.

Figure 21:
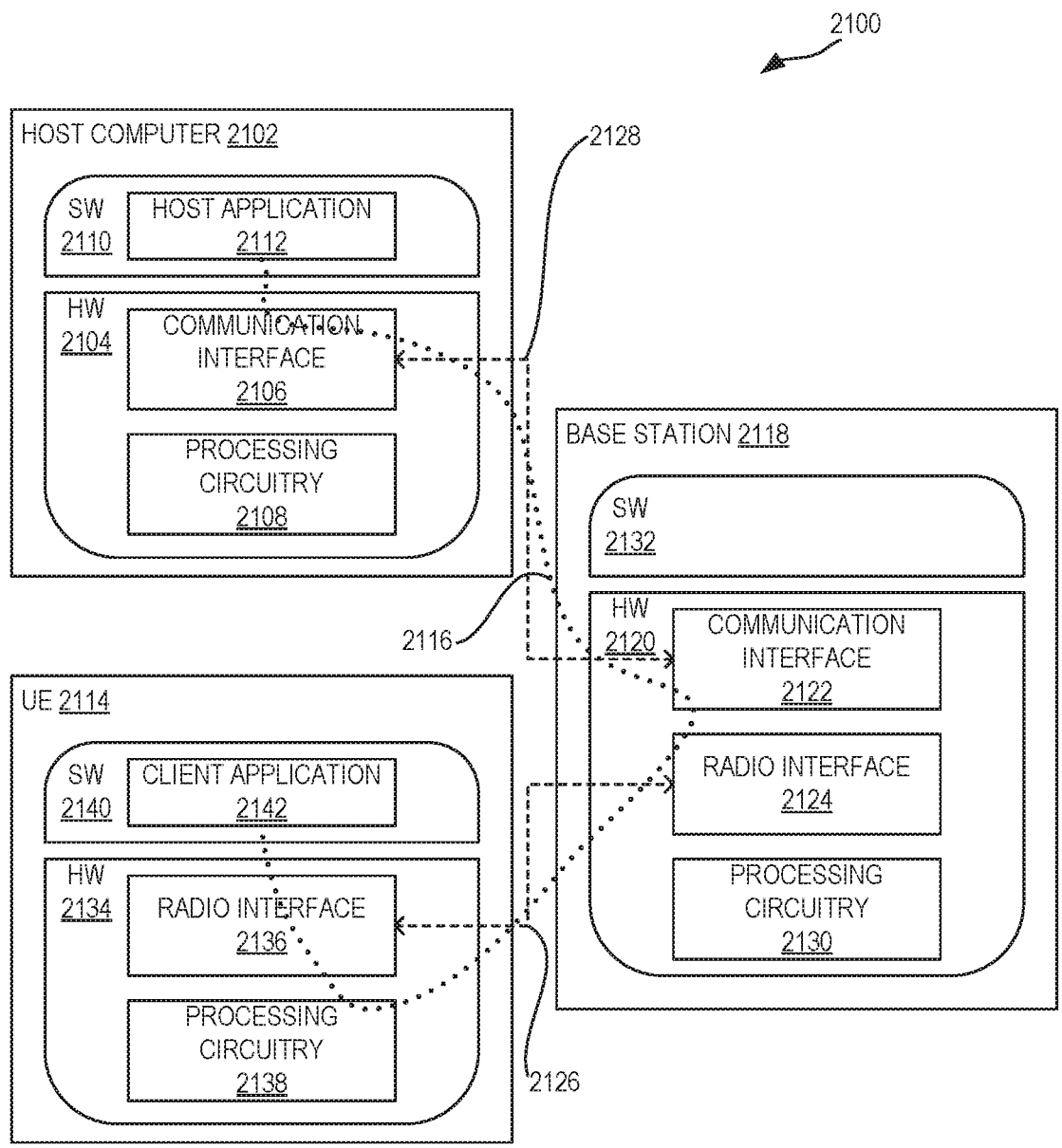

It is noted that the host computer 2102, the base station 2118, and the UE 2114 illustrated in FIG. 21 may be similar or identical to the host computer 2016, one of the base stations 2006A, 2006B, 2006C, and one of the UEs 2012, 2014 of FIG. 20, respectively. This is to say, the inner workings of these entities may be as shown in FIG. 21 and independently, the surrounding network topology may be that of FIG. 20.

In FIG. 21, the OTT connection 2116 has been drawn abstractly to illustrate the communication between the host computer 2102 and the UE 2114 via the base station 2118 without explicit reference to any intermediary devices and the precise routing of messages via these devices. The network infrastructure may determine the routing, which may be configured to hide from the UE 2114 or from the service provider operating the host computer 2102, or both. While the OTT connection 2116 is active, the network infrastructure may further take decisions by which it dynamically changes the routing (e.g., on the basis of load balancing consideration or reconfiguration of the network).

The wireless connection 2126 between the UE 2114 and the base station 2118 is in accordance with the teachings of the embodiments described throughout this disclosure. One or more of the various embodiments improve the performance of OTT services provided to the UE 2114 using the OTT connection 2116, in which the wireless connection 2126 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2116 between the host computer 2102 and the UE 2114, in response to variations in the measurement results. The measurement procedure and/or the network functionality for reconfiguring the OTT connection 2116 may be implemented in the software 2110 and the hardware 2104 of the host computer 2102 or in the software 2140 and the hardware 2134 of the UE 2114, or both. In some embodiments, sensors (not shown) may be deployed in or in association with communication devices through which the OTT connection 2116 passes; the sensors may participate in the measurement procedure by supplying values of the monitored quantities exemplified above, or supplying values of other physical quantities from which the software 2110, 2140 may compute or estimate the monitored quantities. The reconfiguring of the OTT connection 2116 may include message format, retransmission settings, preferred routing, etc.; the reconfiguring need not affect the base station 2118, and it may be unknown or imperceptible to the base station 2118. Such procedures and functionalities may be known and practiced in the art. In certain embodiments, measurements may involve proprietary UE signaling facilitating the host computer 2102's measurements of throughput, propagation times, latency, and the like. The measurements may be implemented in that the software 2110 and 2140 causes messages to be transmitted, in particular empty or 'dummy' messages, using the OTT connection 2116 while it monitors propagation times, errors, etc.

FIG. 22 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 22 will be included in this section. In step 2200, the host computer provides user data. In sub-step 2202 (which may be optional) of step 2200, the host computer provides the user data by executing a host application. In step 2204, the host computer initiates a transmission carrying the user data to the UE. In step 2206 (which may be optional), the base station transmits to the UE the user data which was carried in the transmission that the host computer initiated, in accordance with the teachings of the embodiments described throughout this disclosure. In step 2208 (which may also be optional), the UE executes a client application associated with the host application executed by the host computer.

FIG. 23 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 23 will be included in this section. In step 2300 of the method, the host computer provides user data. In an optional sub-step (not shown) the host computer provides the user data by executing a host application. In step 2302, the host computer initiates a transmission carrying the user data to the UE. The transmission may pass via the base station, in accordance with the teachings of the embodiments described throughout this disclosure. In step 2304 (which may be optional), the UE receives the user data carried in the transmission.

FIG. 24 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 24 will be included in this section. In step 2400 (which may be optional), the UE receives input data provided by the host computer. Additionally or alternatively, in step 2402, the UE provides user data. In sub-step 2404 (which may be optional) of step 2400, the UE provides the user data by executing a client application. In sub-step 2406 (which may be optional) of step 2402, the UE executes a client application which provides the user data in reaction to the received input data provided by the host computer. In providing the user data, the executed client application may further consider user input received from the user. Regardless of the specific manner in which the user data was provided, the UE initiates, in sub-step 2408 (which may be optional), transmission of the user data to the host computer. In step 2410 of the method, the host computer receives the user data transmitted from the UE, in accordance with the teachings of the embodiments described throughout this disclosure.

FIG. 25 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 25 will be included in this section. In step 2500 (which may be optional), in accordance with the teachings of the embodiments described throughout this disclosure, the base station receives user data from the UE. In step 2502 (which may be optional), the base station initiates transmission of the received user data to the host computer. In step 2504 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments

Group A Embodiments

Embodiment 1: A method performed by a wireless device for determining a reference resource, the method comprising one or more of: receiving (1000), from a network node, an indication of at least one configurable offset value to compensate for a Round Trip Time, RTT, value; receiving (1002), from the network node, one or more configurations of resources for channel and/or interference measurement, and further receiving, from the network node, one or more configurations of measurement reporting; and determining (1004), a reference resource for a measurement report to be reported in slot n' using the at least one configurable offset received from the network node.

Embodiment 2: The method of embodiment 1 wherein the at least one configurable offset value to compensate for the RTT value comprises at least one configurable offset value to compensate for a differential and/or common RTT.

Embodiment 3: The method of any of embodiments 1 to 2 wherein the one or more configurations of resources for channel and/or interference measurement comprise one or more configurations of CSI-RS resources for channel and interference measurement.

Embodiment 4: The method of any of embodiments 1 to 3 wherein the one or more configurations of measurement reporting comprises one or more configurations of CSI reporting.

Embodiment 5: The method of any of embodiments 1 to 4 wherein the at least one configurable offset can depend on the numerology used.

Embodiment 6: The method of any of embodiments 1 to 5 wherein the at least one configurable offset can be specifically configured to the wireless device by the network node.

Embodiment 7: The method of embodiment 6 wherein the wireless device is configured via RRC signaling.

Embodiment 8: The method of any of embodiments 1 to 7 wherein the at least one configurable offset can be broadcast by the network node in system information.

Embodiment 9: The method of any of embodiment 8 wherein the at least one configurable offset can be sent in a SIB.

Embodiment 10: The method of any of embodiments 1 to 9 further comprising: determining the time location of the CSI reference resource in downlink slot $n-n_{CSI\_ref}$ where $n_{CSI\_ref}$ is the smallest value greater than or equal to $X \cdot 2^{\mu_{DL}} + K_{offset}$ wherein at least one of: a. $K_{offset}$ is one or a combination (e.g., sum) of the at least one configurable offset; and b. n is given by $$n = \left\lfloor n' \cdot \frac{2^{\mu_{DL}}}{2^{\mu_{UL}}} \right\rfloor,$$

and $\mu_{DL}/\mu_{UL}$ are the downlink/uplink numerology.

Embodiment 11: The method of embodiment 10 wherein X=4 if single CSI-RS resource is configured for channel measurement.

Embodiment 12: The method of embodiment 10 wherein X=5 if multiple CSI-RS resources are configured for channel measurement.

Embodiment 13: The method of any of embodiments 1 to 12 further comprising determining the time location of the CSI reference resource in downlink slot $n-n_{CSI\_ref}$ where $n_{CSI\_ref}$ is the smallest value greater than or equal to $$\lfloor Z' / N_{symb}^{slot} \rfloor + K_{offset},$$

such that slot $n-n_{CSI\_ref}$ corresponds to a valid downlink slot wherein at least one of:
a. $K_{offset}$ is one or a combination (e.g., sum) of the at least one configurable offset; b. n is given by $$n = \left\lfloor n' \cdot \frac{2^{\mu_{DL}}}{2^{\mu_{UL}}} \right\rfloor,$$

and $\mu_{DL}/\mu_{UL}$ are the downlink/uplink numerology; and c. Z' is a parameter that determines delay requirements and $N_{symb}^{slot}$ is the number of symbols per slot.

Embodiment 14: The method of any of embodiments 1 to 13 further comprising: reporting (1006) the measurement report in uplink slot n'.

Embodiment 15: The method of any of embodiments 1 to 14 wherein the network node is a gNB.

Embodiment 16: The method of any of the previous embodiments, further comprising: providing user data; and forwarding the user data to a host computer via the transmission to the base station.

Group B Embodiments

Embodiment 17: A method performed by a base station for determining a reference resource, the method comprising one or more of: transmitting (1100), to a wireless device, an indication of at least one configurable offset value to compensate for a Round Trip Time, RTT, value; transmitting (1102), to the wireless device, one or more configurations of resources for channel and/or interference measurement, and further transmitting, to the wireless device, one or more configurations of measurement reporting; and receiving (1104), from the wireless device, a measurement report using a reference resource in slot n' where the reference resource is determined using the at least one configurable offset received from the network node.

Embodiment 18: The method of embodiment 17 wherein the at least one configurable offset value to compensate for the RTT value comprises at least one configurable offset value to compensate for a differential and/or common RTT.

Embodiment 19: The method of any of embodiments 17 to 18 wherein the one or more configurations of resources for channel and/or interference measurement comprise one or more configurations of CSI-RS resources for channel and interference measurement.

Embodiment 20: The method of any of embodiments 17 to 19 wherein the one or more configurations of measurement reporting comprises one or more configurations of CSI reporting.

Embodiment 21: The method of any of embodiments 17 to 20 wherein the at least one configurable offset can depend on the numerology used.

Embodiment 22: The method of any of embodiments 17 to 21 wherein the at least one configurable offset can be specifically configured to the wireless device by the base station.

Embodiment 23: The method of embodiment 22 wherein the wireless device is configured via RRC signaling.

Embodiment 24: The method of any of embodiments 17 to 23 wherein the at least one configurable offset can be broadcast by the base station in system information.

Embodiment 25: The method of any of embodiment 24 wherein the at least one configurable offset can be sent in a SIB.

Embodiment 26: The method of any of embodiments 17 to 25 further comprising: determining the time location of the CSI reference resource in downlink slot $n-n_{CSI\_ref}$ where $n_{CSI\_ref}$ is the smallest value greater than or equal to $X \cdot 2^{\mu_{DL}} + K_{offset}$ wherein at least one of: a. $K_{offset}$ is one or a combination (e.g., sum) of the at least one configurable offset; and b. n is given by $$n = \left\lfloor n' \cdot \frac{2^{\mu_{DL}}}{2^{\mu_{UL}}} \right\rfloor,$$

and $\mu_{DL}/\mu_{UL}$ are the downlink/uplink numerology.

Embodiment 27: The method of embodiment 26 wherein X=4 if single CSI-RS resource is configured for channel measurement.

Embodiment 28: The method of embodiment 26 wherein X=5 if multiple CSI-RS resources are configured for channel measurement Embodiment 29: The method of any of embodiments 17 to 28 further comprising determining the time location of the CSI reference resource in downlink slot $n-n_{CSI\_ref}$ where $n_{CSI\_ref}$ is the smallest value greater than or equal to $$\lfloor Z' / N_{symb}^{slot} \rfloor + K_{offset},$$

such that slot n−$n_{CSI\_ref}$ corresponds to a valid downlink slot wherein at least one of: a.
  $K_{offset}$ is one or a combination (e.g., sum) of the at least one configurable offset; b. n is given by $$n = \left\lfloor n' \cdot \frac{2^{\mu_{DL}}}{2^{\mu_{UL}}} \right\rfloor,$$

and $\mu_{DL}/\mu_{UL}$ are the downlink/uplink numerology; and c. Z' is a parameter that determines delay requirements and $N_{symb}^{slot}$ is the number of symbols per slot.

Embodiment 30: The method of any of embodiments 17 to 29 wherein the base station is a gNB.

Embodiment 31: The method of any of the previous embodiments, further comprising: obtaining user data; and forwarding the user data to a host computer or a wireless device.

Group C Embodiments

Embodiment 32: A wireless device for determining a reference resource, the wireless device comprising: processing circuitry configured to perform any of the steps of any of the Group A embodiments; and power supply circuitry configured to supply power to the wireless device.

Embodiment 33: A base station for determining a reference resource, the base station comprising: processing circuitry configured to perform any of the steps of any of the Group B embodiments; and power supply circuitry configured to supply power to the base station.

Embodiment 34: A User Equipment, UE, for determining a reference resource, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 35: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 36: The communication system of the previous embodiment further including the base station.

Embodiment 37: The communication system of the previous 2 embodiments, further including the UE, wherein the UE is configured to communicate with the base station.

Embodiment 38: The communication system of the previous 3 embodiments, wherein: the processing circuitry of the host computer is configured to execute a host application, thereby providing the user data; and the UE comprises processing circuitry configured to execute a client application associated with the host application.

Embodiment 39: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 40: The method of the previous embodiment, further comprising, at the base station, transmitting the user data.

Embodiment 41: The method of the previous 2 embodiments, wherein the user data is provided at the host computer by executing a host application, the method further comprising, at the UE, executing a client application associated with the host application.

Embodiment 42: A User Equipment, UE, configured to communicate with a base station, the UE comprising a radio interface and processing circuitry configured to perform the method of the previous 3 embodiments.

Embodiment 43: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 44: The communication system of the previous embodiment, wherein the cellular network further includes a base station configured to communicate with the UE.

Embodiment 45: The communication system of the previous 2 embodiments, wherein: the processing circuitry of the host computer is configured to execute a host application, thereby providing the user data; and the UE's processing circuitry is configured to execute a client application associated with the host application.

Embodiment 46: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 47: The method of the previous embodiment, further comprising at the UE, receiving the user data from the base station.

Embodiment 48: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 49: The communication system of the previous embodiment, further including the UE.

Embodiment 50: The communication system of the previous 2 embodiments, further including the base station, wherein the base station comprises a radio interface configured to communicate with the UE and a communication interface configured to forward to the host computer the user data carried by a transmission from the UE to the base station.

Embodiment 51: The communication system of the previous 3 embodiments, wherein: the processing circuitry of the host computer is configured to execute a host application; and the UE's processing circuitry is configured to execute a client application associated with the host application, thereby providing the user data.

Embodiment 52: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 53: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 54: The method of the previous embodiment, further comprising, at the UE, providing the user data to the base station.

Embodiment 55: The method of the previous 2 embodiments, further comprising: at the UE, executing a client application, thereby providing the user data to be transmitted; and at the host computer, executing a host application associated with the client application.

Embodiment 56: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 57: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 58: The communication system of the previous embodiment further including the base station.

Embodiment 59: The communication system of the previous 2 embodiments, further including the UE, wherein the UE is configured to communicate with the base station.

Embodiment 60: The communication system of the previous 3 embodiments, wherein: the processing circuitry of the host computer is configured to execute a host application; and the UE is configured to execute a client application associated with the host application, thereby providing the user data to be received by the host computer.

Embodiment 61: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 62: The method of the previous embodiment, further comprising at the base station, receiving the user data from the UE.

Embodiment 63: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
CSI Channel State Information
CSI-RS Channel State Information Reference Signal
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
NTN Non-Terrestrial Network
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRC Radio Resource Control
RRH Remote Radio Head
RTT Round Trip Time
RS Reference Signal
SCEF Service Capability Exposure Function
SIB System Information Block
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless device for determining a Channel State Information, CSI, reference resource, the method comprising:
receiving, from a network node, an indication of at least one configurable offset value;
receiving, from the network node, one or more configurations of CSI Resource Signal, CSI-RS, resources for channel and/or CSI Interference Measurement, CSI- IM, resources for interference measurement, and one or more configurations of CSI reporting; and determining a CSI reference resource for a CSI report to be reported in an uplink slot n' using the at least one configurable offset value received from the network node;

wherein the at least one configurable offset value comprises at least one configurable offset value to compensate for timing adjustments.

2. The method of claim 1 wherein the at least one configurable offset value comprises at least one configurable offset value to compensate for a differential and/or a common, Round Trip Time, RTT.

3. The method of claim 1 wherein the at least one configurable offset value can depend on a numerology used.

4. The method of claim 1 wherein the at least one configurable offset value can be configured to the wireless device by the network node.

5. The method of claim 4 wherein the at least one configurable offset value is configured via Radio Resource Control, RRC, signaling.

6. The method of claim 1 wherein the at least one configurable offset value can be broadcast by the network node in system information.

7. The method of claim 6 wherein the at least one configurable offset value can be sent in a System Information Block, SIB.

8. The method of claim 1 further comprising: determining a time location of the CSI reference resource in downlink slot n−$n_{CSI\_ref}$ where $n_{CSI\_ref}$ is a smallest value greater than or equal to $X \cdot 2^{\mu_{DL}} + K_{offset}$ wherein at least one of:

a. $K_{offset}$ is one or a combination of the at least one configurable offset value; and b. n is given by $$n = \left\lfloor n' \cdot \frac{2^{\mu_{DL}}}{2^{\mu_{UL}}} \right\rfloor,$$

and $\mu_{DL}$ and $\mu_{UL}$ are a downlink and uplink numerology, respectively.

9. The method of claim 8 wherein X=4 if a single CSI-RS resource is configured for channel measurement.

10. The method of claim 8 wherein X=5 if multiple CSI-RS resources are configured for channel measurement.

11. The method of claim 1 further comprising determining a time location of the CSI reference resource in downlink slot n−$n_{CSI\_ref}$ where $n_{CSI\_ref}$ is a smallest value greater than or equal to $$\left\lfloor Z' / N_{symb}^{slot} \right\rfloor + K_{offset},$$

such that slot n−$n_{CSI\_ref}$ corresponds to a valid downlink slot wherein at least one of:

a. $K_{offset}$ is one or a combination of the at least one configurable offset value;

b. n is given by $$n = \left\lfloor n' \cdot \frac{2^{\mu_{DL}}}{2^{\mu_{UL}}} \right\rfloor,$$

and $\mu_{DL}/\mu_{UL}$ are downlink/uplink numerology; and c. Z' is a parameter that determines delay requirements and $N_{symb}^{slot}$ is a number of symbols per slot.

12. The method of claim 1 further comprising: reporting the measurement report in the uplink slot n'.

13. The method of claim 1 wherein the network node is a gNB.

14. The method of claim 1 wherein the wireless device is a User Equipment, UE.

15. A method performed by a base station for determining a Channel State Information, CSI, reference resource, the method comprising:

transmitting, to a wireless device, at least one configurable offset value;

transmitting, to the wireless device, one or more configurations of CSI Resource Signal, CSI-RS, resources for channel and/or CSI Interference Measurement, CSI-IM, resources for interference measurement, and further transmitting, to the wireless device, one or more configurations of CSI reporting; and receiving, from the wireless device, a CSI report using a CSI reference resource in slot n' where the reference resource is determined using the at least one configurable offset value received from a network node;

wherein the at least one configurable offset value comprises at least one configurable offset value to compensate for timing adjustments.

16. The method of claim 15 wherein the at least one configurable offset value comprises at least one configurable offset value to compensate for a differential and/or common Round Trip Time, RTT.

17. The method of claim 15 wherein the at least one configurable offset value can depend on a numerology used.

18. The method of claim 15 wherein the at least one configurable offset value can be configured to the wireless device by the base station.

19. The method of claim 18 wherein the at least one configurable offset value is configured via Radio Resource Control, RRC, signaling.

20. The method of claim 15 wherein the at least one configurable offset value can be broadcast by the base station in system information.

21. The method of claim 20 wherein the at least one configurable offset value can be sent in a System Information Block, SIB.

22. The method of claim 15 further comprising: determining a time location of the CSI reference resource in downlink slot n−$n_{CSI\_ref}$ where $n_{CSI\_ref}$ is a smallest value greater than or equal to $X \cdot 2^{\mu_{DL}} + K_{offset}$ wherein at least one of:

a. $K_{offset}$ is one or a combination of the at least one configurable offset value; and b. n is given by $$n = \left\lfloor n' \cdot \frac{2^{\mu_{DL}}}{2^{\mu_{UL}}} \right\rfloor,$$

and $\mu_{DL}$ and $\mu_{UL}$ are downlink and uplink numerology, respectively.

23. The method of claim 22 wherein X=4 if a single CSI-RS resource is configured for channel measurement.

24. The method of claim 22 wherein X=5 if multiple CSI-RS resources are configured for channel measurement.

25. The method of claim 15 further comprising determining the time location of the CSI reference resource in downlink slot n−$n_{CSI\_ref}$ where $n_{CSI\_ref}$ is the smallest value greater than or equal to $$\lfloor Z' / N^{slot}_{symb} \rfloor + K_{offset},$$

such that slot $n - n_{CSI\_ref}$ corresponds to a valid downlink slot wherein at least one of:
a. $K_{offset}$ is one or a combination (e.g., sum) of the at least one configurable offset value;
b. n is given by $$n = \lfloor n' \cdot \frac{2^{\mu_{DL}}}{2^{\mu_{UL}}} \rfloor,$$

and $\mu_{DL}/\mu_{UL}$ are downlink/uplink numerology; and
c. Z' is a parameter that determines delay requirements and $N_{symb}^{slot}$ is a number of symbols per slot.

26. The method of claim 15 wherein the base station is a gNB.

27. A wireless device for determining a Channel State Information, CSI, reference resource, the wireless device comprising:
one or more processors; and
memory storing instructions executable by the one or more processors, whereby the wireless device is operable to:
receive, from a network node, an indication of at least one configurable offset value to compensate;
receive, from the network node, one or more configurations of CSI Resource Signal, CSI-RS, resources for channel and/or CSI Interference Measurement, CSI-IM, resources for interference measurement, and one or more configurations of CSI reporting; and
determine a CSI reference resource for a CSI report to be reported in slot n' using the at least one configurable offset value received from the network node;
wherein the at least one configurable offset value comprises at least one configurable offset value to compensate for timing adjustments.

28. A base station for determining a Channel State Information, CSI, reference resource, the base station comprising:
one or more processors; and
memory comprising instructions to cause the base station to:
transmit, to a wireless device, an indication of at least one configurable offset value to compensate;
transmit, to the wireless device, one or more configurations of CSI Resource Signal, CSI-RS, resources for channel and/or CSI Interference Measurement, CSI-IM, resources for interference measurement, and further transmitting, to the wireless device, one or more configurations of CSI reporting; and
receive, from the wireless device, a CSI report using a CSI reference resource in slot n' where the reference resource is determined using the at least one configurable offset value received from a network node;
wherein the at least one configurable offset value comprises at least one configurable offset value to compensate for timing adjustments.

* * * * *